Nov. 29, 1960   F. R. WERNER ET AL   2,962,209
TOTALIZER AND SPECIAL COUNTER EQUIPMENT FOR CASH REGISTERS
Filed Feb. 25, 1954   11 Sheets-Sheet 1

INVENTORS
FRANK R. WERNER &
KENNETH C. FLINT
BY

THEIR ATTORNEYS

Nov. 29, 1960   F. R. WERNER ET AL   2,962,209
TOTALIZER AND SPECIAL COUNTER EQUIPMENT FOR CASH REGISTERS
Filed Feb. 25, 1954   11 Sheets-Sheet 2
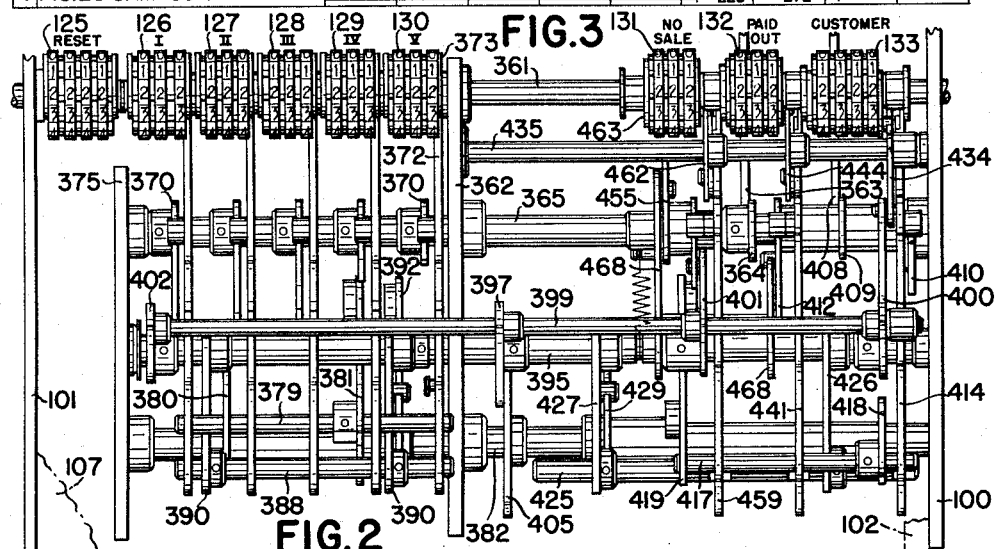
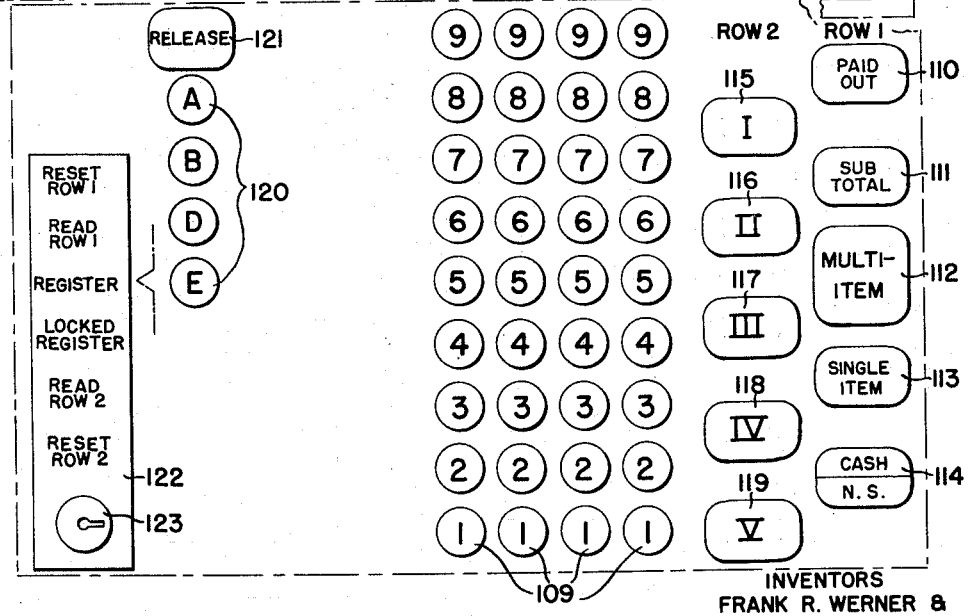
INVENTORS
FRANK R. WERNER &
KENNETH C. FLINT
BY *Earl Beust*
*Richard Van Buren*
THEIR ATTORNEYS

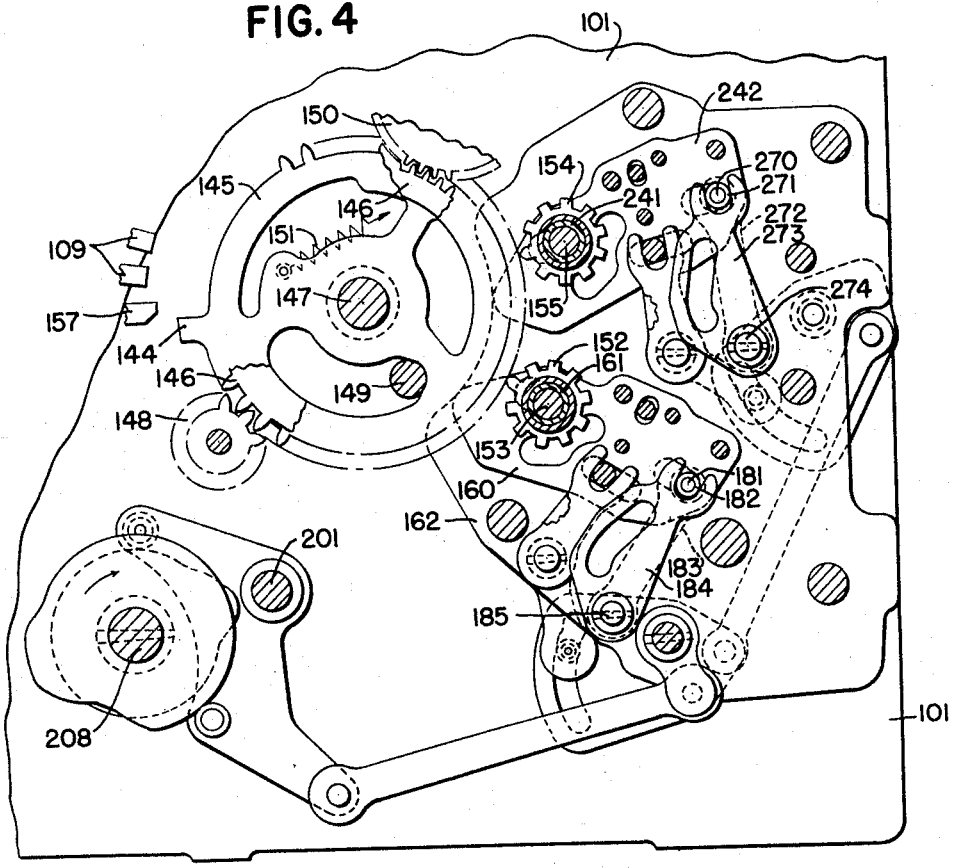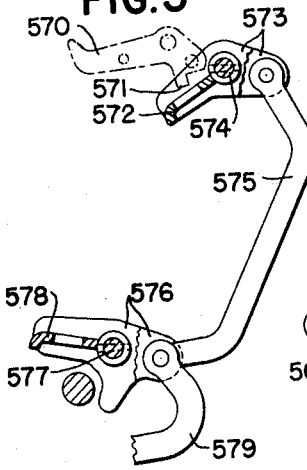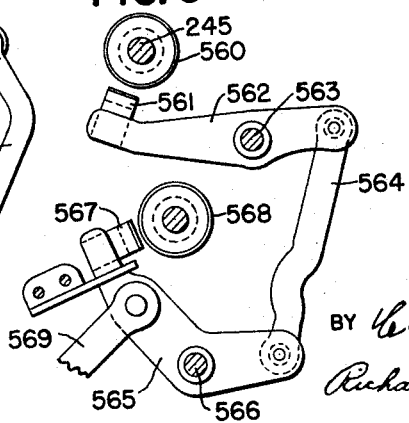

Nov. 29, 1960   F. R. WERNER ET AL   2,962,209
TOTALIZER AND SPECIAL COUNTER EQUIPMENT FOR CASH REGISTERS
Filed Feb. 25, 1954   11 Sheets-Sheet 4

INVENTORS
FRANK R. WERNER &
KENNETH C. FLINT
BY
THEIR ATTORNEYS

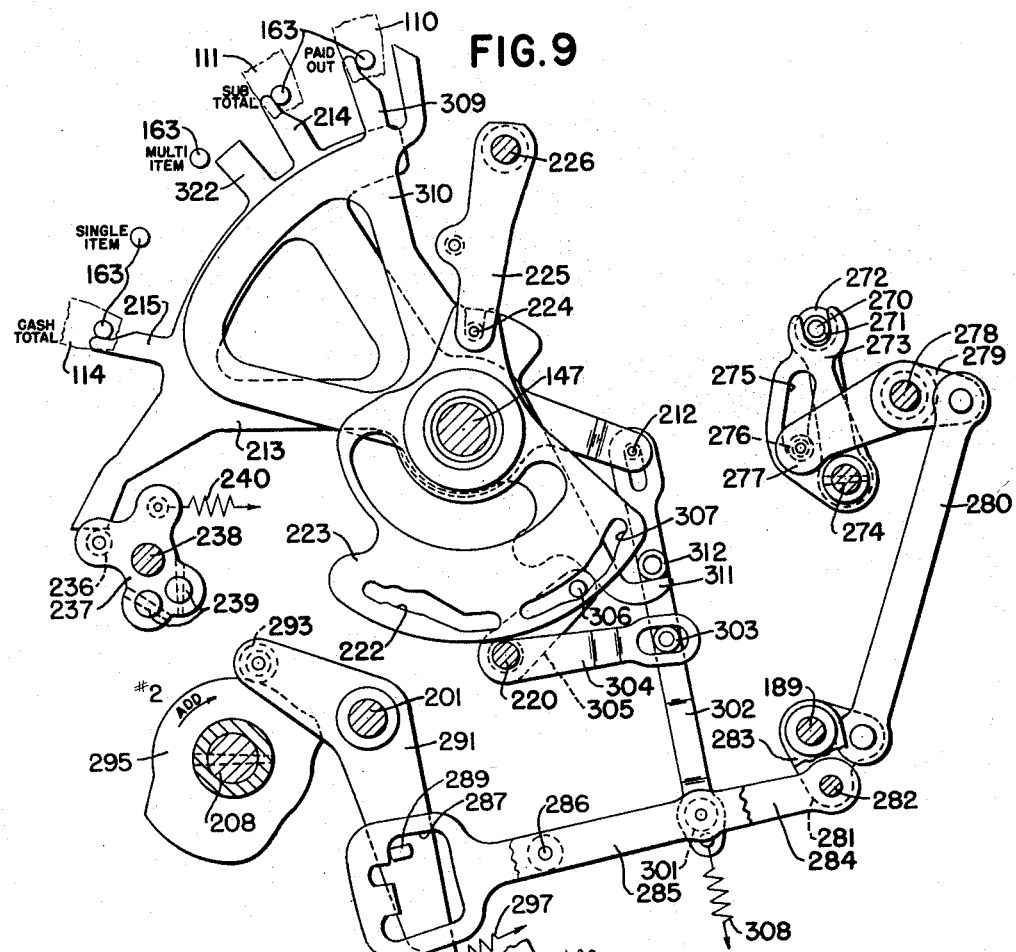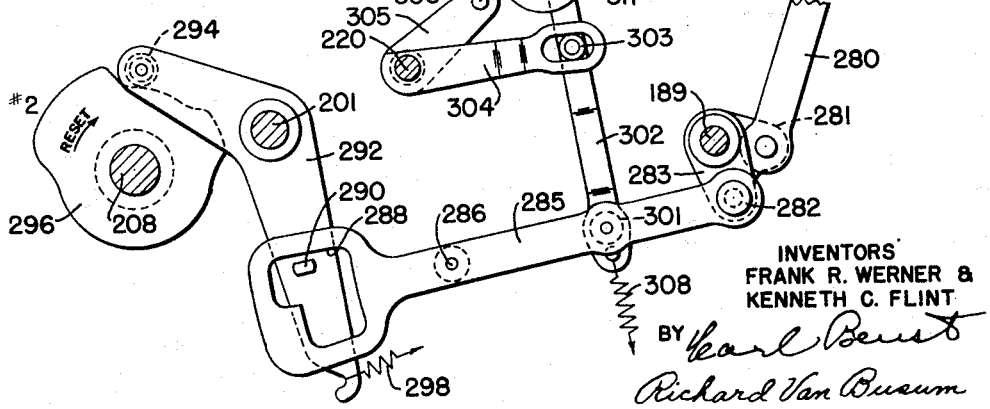

Nov. 29, 1960  F. R. WERNER ET AL  2,962,209
TOTALIZER AND SPECIAL COUNTER EQUIPMENT FOR CASH REGISTERS
Filed Feb. 25, 1954  11 Sheets-Sheet 6
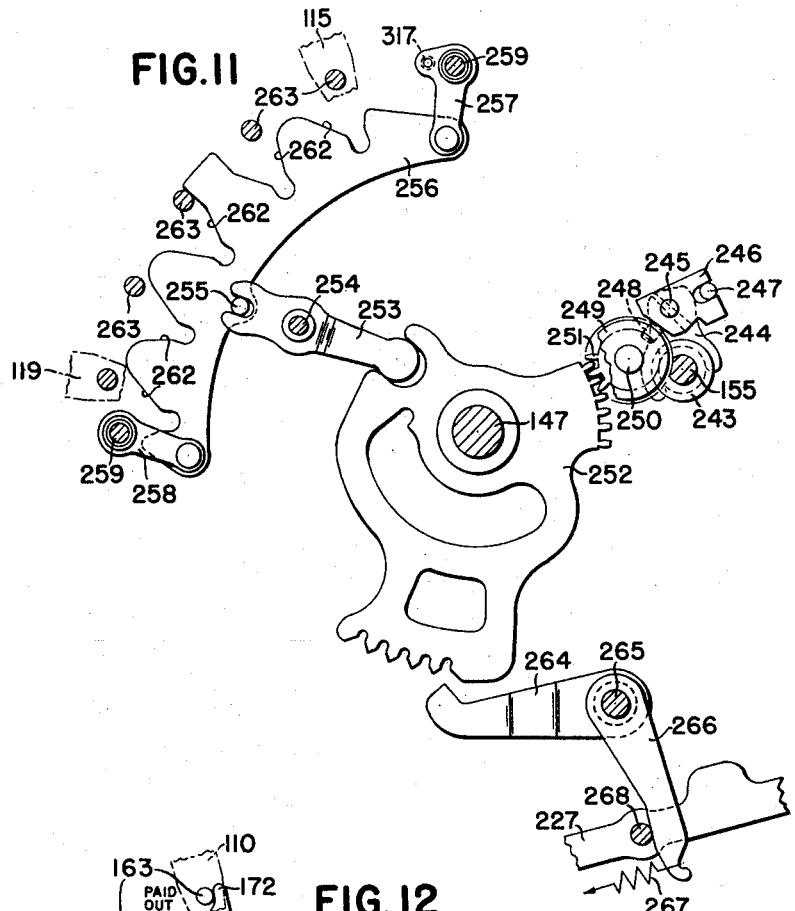
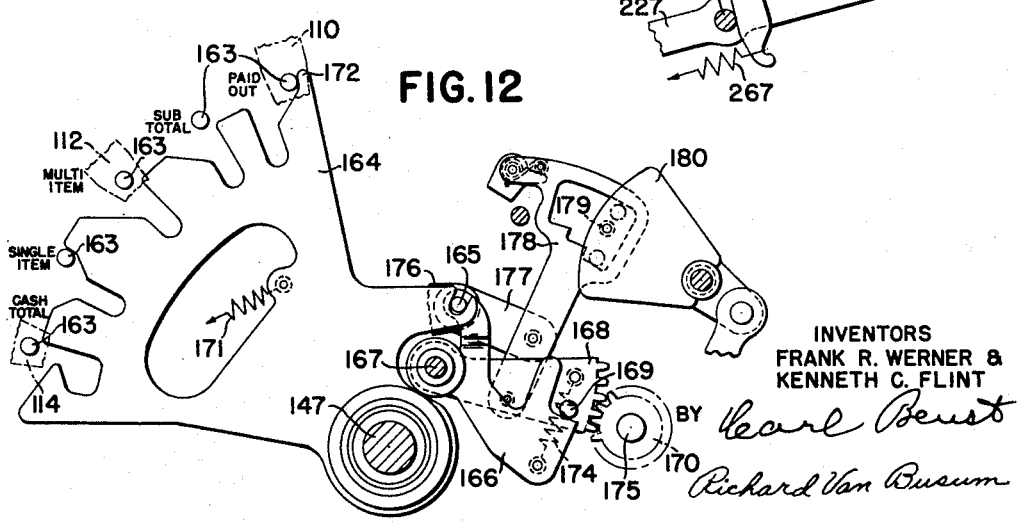
INVENTORS
FRANK R. WERNER &
KENNETH C. FLINT
BY
THEIR ATTORNEYS

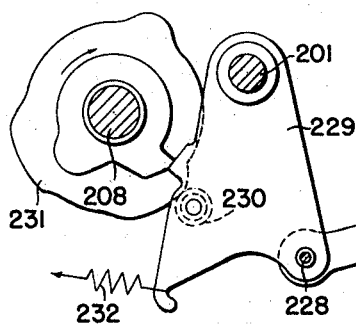
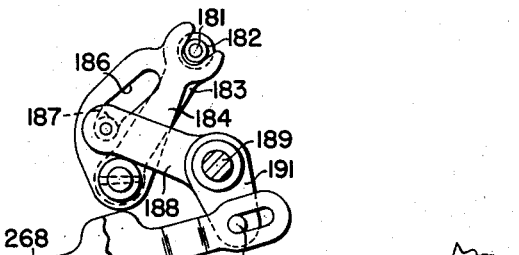
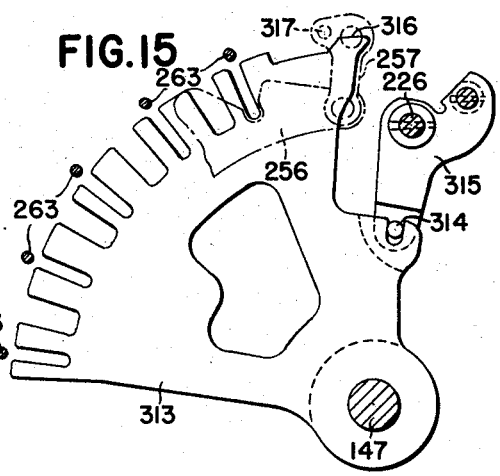
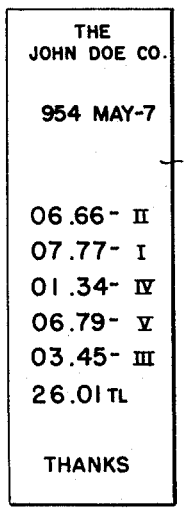
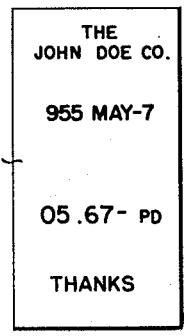

Nov. 29, 1960  F. R. WERNER ET AL  2,962,209
TOTALIZER AND SPECIAL COUNTER EQUIPMENT FOR CASH REGISTERS
Filed Feb. 25, 1954  11 Sheets-Sheet 8
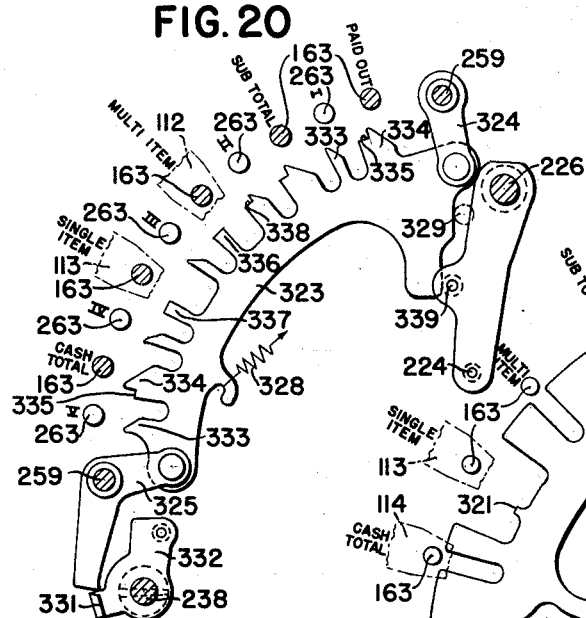
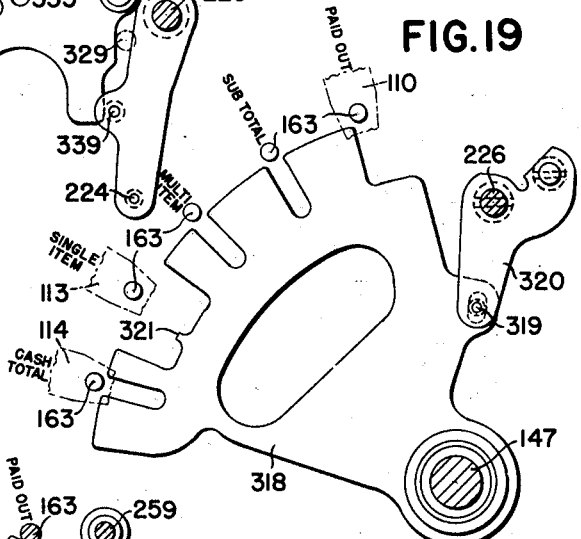
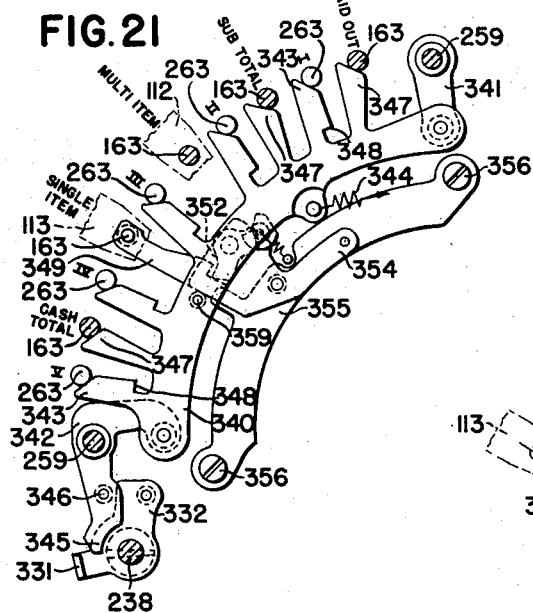
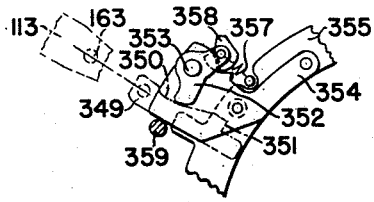
INVENTORS
FRANK R. WERNER &
KENNETH C. FLINT
THEIR ATTORNEYS

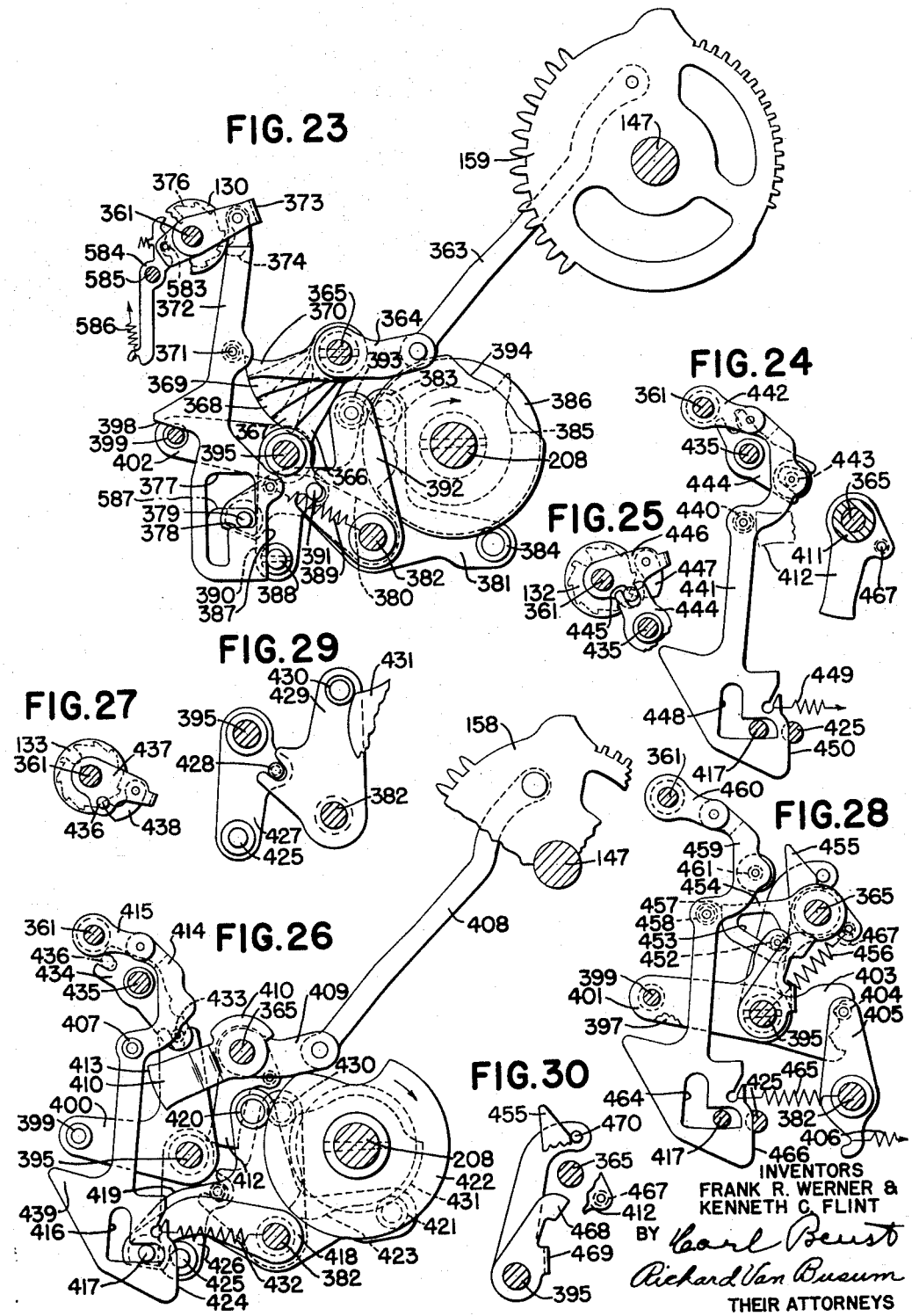

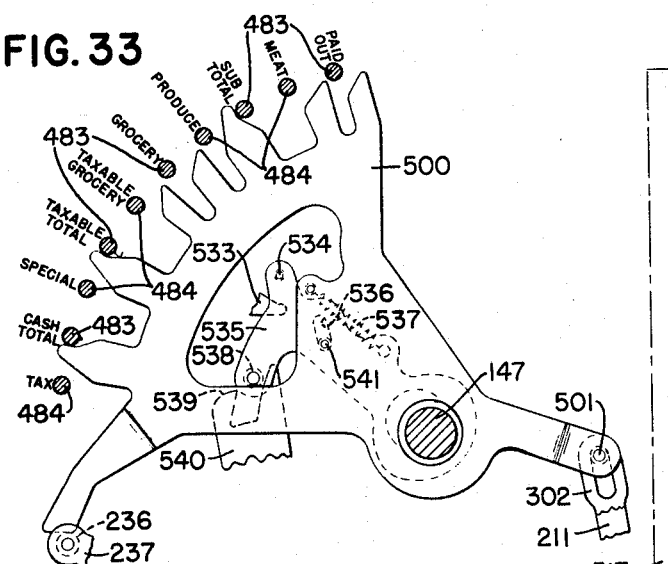
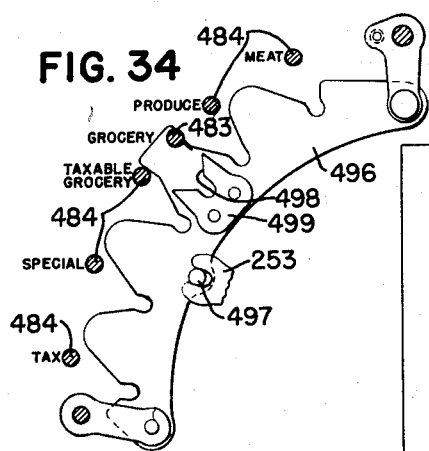
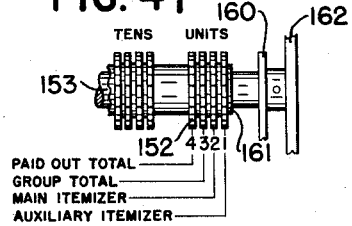
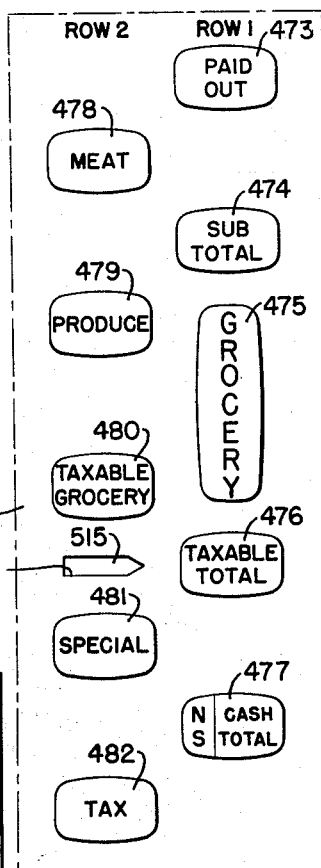

Nov. 29, 1960  F. R. WERNER ET AL  2,962,209
TOTALIZER AND SPECIAL COUNTER EQUIPMENT FOR CASH REGISTERS
Filed Feb. 25, 1954  11 Sheets-Sheet 11
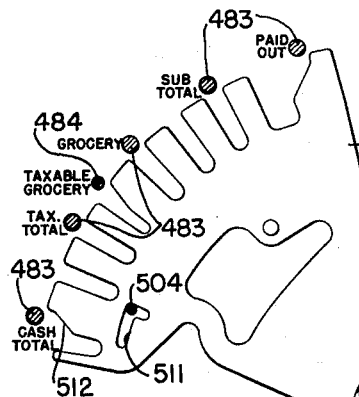
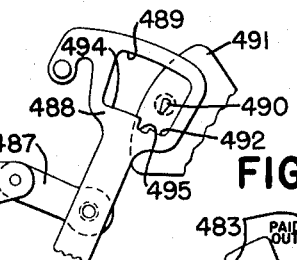
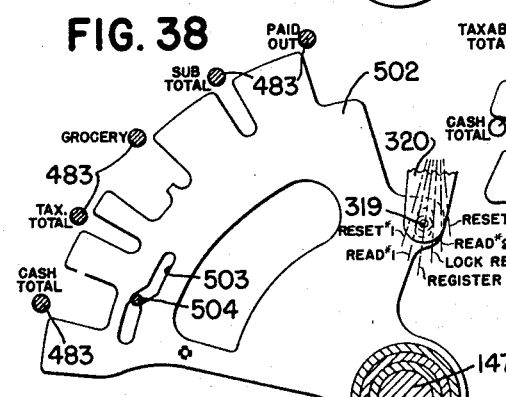
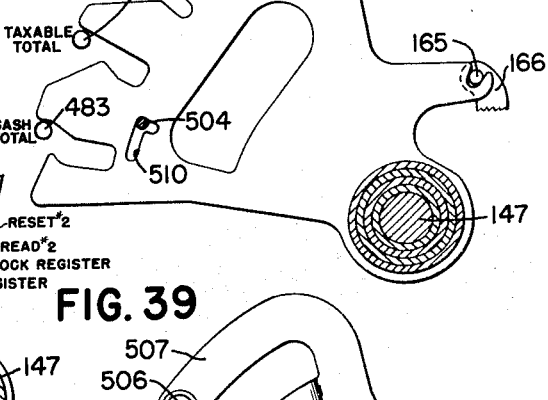
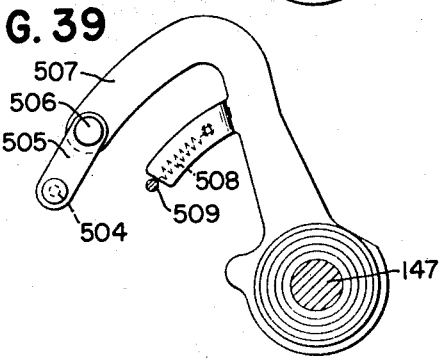
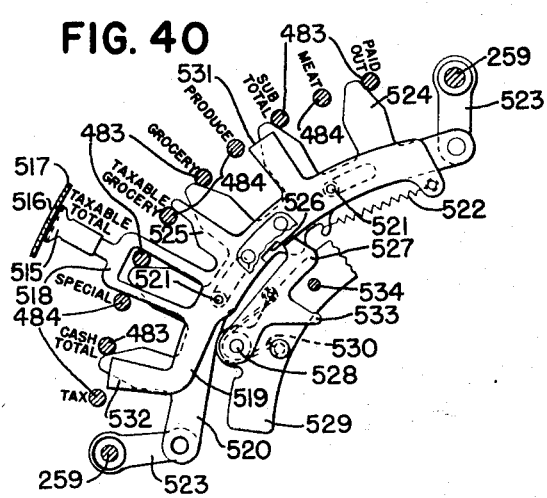
INVENTORS
FRANK R. WERNER &
KENNETH C. FLINT
THEIR ATTORNEYS United States Patent Office 2,962,209
Patented Nov. 29, 1960

2,962,209

TOTALIZER AND SPECIAL COUNTER EQUIPMENT FOR CASH REGISTERS

Frank R. Werner and Kenneth C. Flint, Dayton, Ohio, assignors to The National Cash Register Company, Dayton, Ohio, a corporation of Maryland Filed Feb. 25, 1954, Ser. No. 412,464

11 Claims. (Cl. 235—6)

This invention relates to cash registers and accounting machines, and is particularly directed to the totalizer equipment and to selectively-operated special counters for keeping an accurate count of the number of times the totalizers are selected for certain functions.

It is a general object of this invention to provide a compact and efficient cash register of economical construction, having many of the appointments and features of larger and more costly machines.

Another object is the provision of a machine of economical and efficient structure having two totalizer lines, each of which supports a plurality of sets of selectable totalizers.

Still another object is to provide improved means for selecting and conditioning the various totalizers for coaction with the amount differential mechanism.

A further object of this invention is to provide a plurality of step-by-step counters which function automatically to maintain an accurate count of the number of times the different sets of totalizers are selected for certain functions.

Another object is to supply means to selectively control the selection of two of the step-by-step counters by a single control element having a dual function.

A further object is the provision of means to automatically control the selection and operation of two of the step-by-step counters by a single control element for controlling two separate functions of the machine to obtain an accurate count of the two functions.

Another object of this invention is to provide means for separately listing different classes of items, without the necessity of pre-sorting said items into their separate classes.

Another object is the provision of a dual listing mechanism for use in connection with cash registers and accounting machines.

A further object is to provide a machine of the character described, with two item totalizers for the indiscriminate listing of two different classes of items.

Another object is to provide a machine having two item totalizers, with means to visibly indicate the condition of one of said item totalizers.

A further object is to provide a machine having two item totalizers, with means for enforcing the clearing or zeroizing of a certain one of said totalizers before the other of said totaizers may be cleared.

Still another object is to provide a machine having two item totalizers, with means rendered effective by the entering of an amount in one of said totalizers to enforce a total-taking operation in said totalizer before a total-taking operation may be performed in the other totalizer.

A further object is to provide a machine having two item totalizers with means rendered effective by a first control element for totalizing one of the item totalizers and for transferring the amount therein to the other item totalizer.

With these and incidental objects in view the invention includes certain novel features of construction and combinations of parts, a preferred form or embodiment of which is hereinafter described with reference to the drawings which accompany and form a part of this specification.

In the drawings:

Fig. 2 is a diagrammatic view of the keyboard of the machine embodying the present invention.

Fig. 3 is a front elevation showing a side spacing view of the special counter mechanism.

Fig. 4 is a right side elevation showing the two totalizer lines and the amount differential mechanism for actuating the various sets of totalizers mounted thereon.

Fig. 5 is a detail view of the mechanism for preventing tripping of the transfer pawls in total-taking operations.

Fig. 6 is a detail view of the mechanism for alining the shiftable totalizer lines against displacement during machine operation.

Fig. 9 is a right side elevation of a portion of the mechanism for controlling the engaging and disengaging movement of the #2 totalizer line in adding operations.

Fig. 10 is a detail view of a portion of the mechanism for controlling the engaging and disengaging movement of the #2 totalizer in total-taking operations.

Fig. 11 is a right side elevation of a portion of the mechanism for controlling the shifting movement of the #2 totalizer line.

Fig. 12 is a detail view of a portion of the mechanism for controlling the shifting of the #1 or lower totalizer line.

Fig. 13 is a detail view of the mechanism for imparting disengaging movement of the #1 totalizer line.

Fig. 14 is a detail view showing a portion of the mechanism for imparting disengaging movement to the #2 totalizer line.

Fig. 15 is a detail view of a control plate associated with the #2 control keys.

Fig. 16 is a facsimile of a fragmentary portion of a detail strip prepared by the machine of this invention.

Fig. 17 is a facsimile of a multiple-item receipt prepared on the machine of this invention.

Fig. 18 is a facsimile of a single item receipt prepared on the machine of this invention.

Fig. 19 is a detail view of a control plate associated with the #1 control keys.

Figs. 20 and 21 are detail views of interlocking mechanism between the #1 and #2 transaction keys.

Fig. 22 is a detail view of a portion of the mechanism shown in Fig. 21, showing, in particular, control mechanism associated with a certain one of the #1 control keys.

Fig. 23 is a right side elevation showing, in particular, a part of the differential mechanism for the #2 control keys and the mechanism associated therewith for selecting the corresponding special counters for keeping an accurate count of certain functions performed in the corresponding #2 totalizers.

Fig. 24 is a detail view of the mechanism for operating the Paid-Out special counter.

Fig. 25 is a detail view of the Paid-Out special counter.

Fig. 26 is a right side elevation showing a fragmentary portion of the differential mechanism for the #1 control keys and the mechanism associated therewith for selecting the special counters corresponding to the totalizers on the #1 line, to select said counters for keeping an accurate count of certain functions performed in said totalizers.

Fig. 27 is a detail view of the Customer special counter.

Fig. 28 is a detail view of the mechanism for automatically selecting either of two of the special counters under control of a single #1 control key.

Fig. 29 is a detail view of a part of the control and operating mechanism, shown in Fig. 26, for certain of special counters.

Fig. 30 is a detail view of a part of the mechanism shown in Fig. 28, for controlling the operation of the No Sale special counter.

Fig. 31 is a time chart showing, in graphic form, the action of certain cams for operating and controlling the special counters.

Fig. 32 is a diagrammatic view showing the #1 and #2 transaction keys for the modified form of machine.

Fig. 33 is a detail view of a control segment for controlling the engaging and disengaging movement of the totalizer lines under control of the keys shown in Fig. 32.

Fig. 34 is a detail view of the control plate for selecting the totalizers on the #2 totalizer line.

Fig. 35 is a facsimile of a multiple-item receipt issued by the modified form of machine.

Fig. 36 is a right side elevation of a portion of the selecting mechanism for the totalizers on the #1 totalizer line.

Fig. 37 is a detail view of a segment which operates in conjunction with a segment shown in Fig. 36, for controlling the selection of the totalizer on the #1 line.

Fig. 38 is a detail view of a locking plate controlled by the total control lever for locking the control keys under certain conditions.

Fig. 39 is a detail view of the mechanism for locking the segments, shown in Figs. 36 and 37, together for unitary movement under control of the locking plate shown in Fig. 38.

Fig. 40 is a detail view of indicating mechanism for indicating when an amount has been entered in the tax item total or itemizer.

Fig. 41 is a fragmentary detail view, showing two denominational orders of the #1 totalizer line for the modified form.

The machine chosen to illustrate the present invention has many basic principles and features which are similar in many respects to those of a well-known type of cash register, which is fully disclosed in the following United States patents: No. 1,816,263, issued July 28, 1931; No. 1,929,652, issued October 10, 1933; No. 2,048,200, issued July 21, 1936; and No. 2,056,485, issued October 6, 1936, all to William H. Robertson.

Reference may be had to the above-listed patents for a history of the development of the pioneer machines of this type and for a complete disclosure of mechanism used in the present machine, which is similar to the corresponding mechanism of the pioneer or basic machines, and which for that reason will be described only in general terms in the present application.

Likewise, the machine embodying the present invention is identical in its appearance and in many of its structural details to the machine disclosed in co-pending application for Letters Patent of the United States, Serial No. 341,633, filed March 11, 1953, by Frank R. Werner et al., inventors, now Patent No. 2,880,930, to which reference may be had for a full disclosure of similar mechanism illustrated in the present application, and which will be described only in general terms, unless it is pertinent to the present invention.

Mechanism pertinent to the present invention will be fully described in the ensuing pages.

MACHINE IN GENERAL AND ITS SUPPORTING FRAMEWORK

Figure 1:
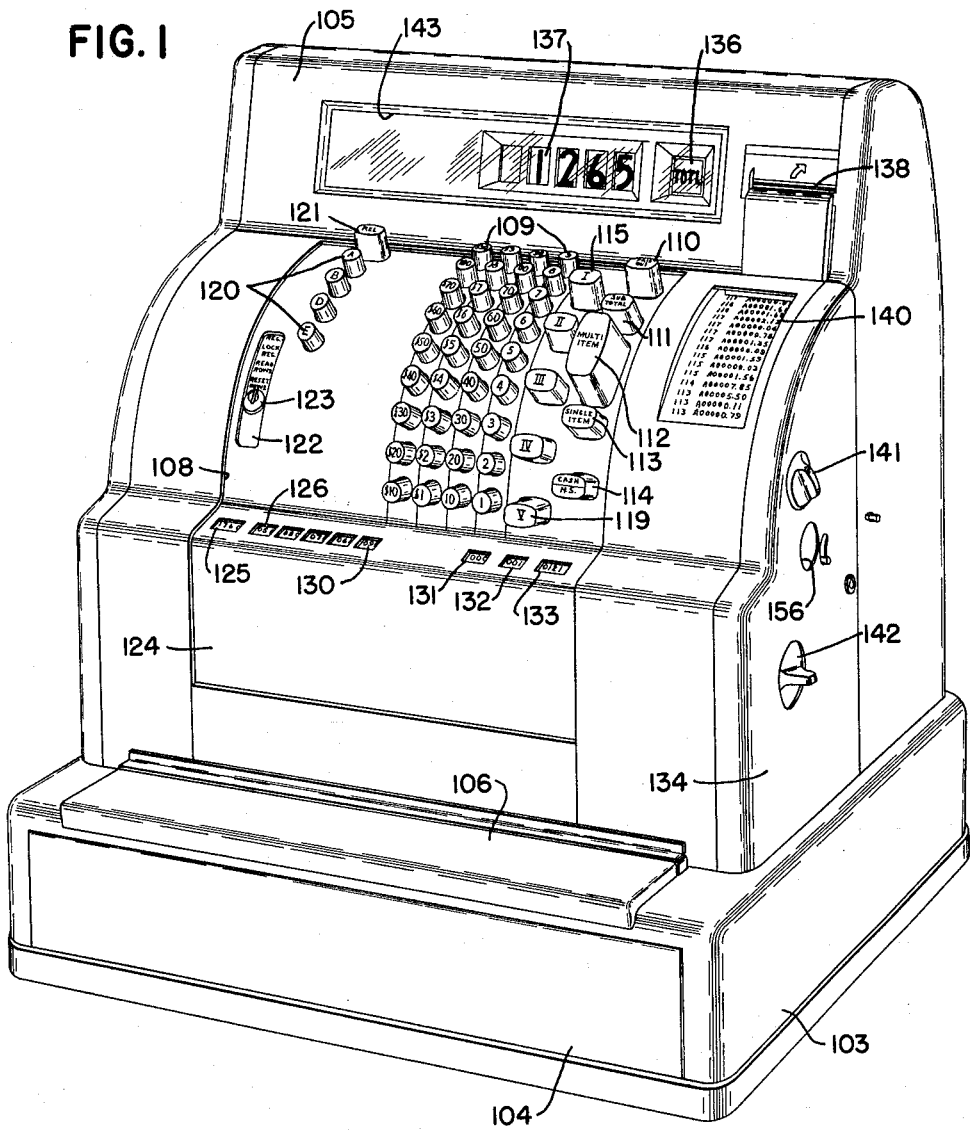
Fig. 1 is a perspective view of the machine embodying the various features of the present invention.

The mechanism of the machine is supported by right and left side frames 100 and 101 (Fig. 3) and by corresponding auxiliary frames, not shown, secured to the upper ends of said right and left frames, which latter are in turn secured at their lower ends to a machine base plate 102. The base plate 102 rests in and is secured to a shallow pan, not shown, in turn secured to the top surface of a drawer cabinet 103 (Fig. 1), which has mounted therein a cash drawer 104, which opens automatically at the end of machine operations, as will be explained later, and which may be opened manually by authorized persons, having a key to the right-hand closure of a machine case or cabinet 105 (Fig. 1). The cabinet 105 encloses the mechanism of the machine and is constructed of suitable material, such as sheet metal, and is secured to the machine base plate 102 near its perimeter by suitable screws, which engage threaded holes in said machine base plate 102. The side frames 100 and 101 (Fig. 3) are maintained in proper side-spaced relationship to each other by the base plate 102, by a back plate 107 secured between said side frames, and by various cross bars, plates, rods and shafts, which will be explained in their proper order as the description progresses.

The cabinet 105 (Figs. 1 and 2) has a large opening 108 in the front thereof, to provide proper clearance for the keyboard and special counter mechanisms. The keyboard of the present machine comprises four rows or denominational orders of amount keys 109, a row of #1 selecting or control keys 110 to 114 inclusive, a row of #2 selecting or control keys 115 to 119 inclusive, four Clerks keys 120, and a release key 121, for releasing any depressed key prior to operation of the machine. The keyboard of the machine also includes a total control lever 122 often referred to as a "Unit Lock Lever," which is movable to various positions to control the various functions of the machine, said positions including Adding or Register position, Locked-Register position, and #1 and #2 Reading and Resetting positions. The total control lever 122 (Figs. 1 and 2) has incorporated therein a lock 123, which is provided with two keys, one of which permits said lever to be locked in either Register or Locked-Register position so that said lever may not be moved out of there positions by unauthorized persons not in possession of said key. The total control lever 122 is normally locked against movement into either #1 or #2 Reset position, and a special reset key is provided for the lock 123, for unlocking the lever so that it may be moved to either of these reset positions. It is, therefore, impossible for persons not in possession of a reset key to move the total control lever to either of its reset positions to clear the amount from any of the totalizers which are controlled by said lever 122.

The keyboard of the machine likewise includes a plurality of special counters 125 to 133 inclusive (Figs. 1 and 3), the wheels of which are visible through corresponding openings in a special counter cover plate 124, which is secured to the machine framework, and is readily removable, when the machine cabinet 105 is removed, to provide access to the special counter mechanism.

The special counters include a Reset counter 125, which counts 1 each time the total control lever 122 is moved either to #1 or #2 Reset position (see also Fig. 3), five #2 transaction counters 126 to 130 inclusive, which correspond to the transaction control keys 115 to 119, and are selected for actuation by said control keys through their differential mechanism, as will be explained later. Use of one of the control keys 115 to 119 to select the corresponding totalizer on the #2 line for actuation in either adding, reading or resetting operations, causes the corresponding special counter 126 to 130 to be selected for actuation and during machine operation 1 is added in said corresponding counter.

There are three special counters—131, 132 and 133, for the first row of transaction keys. Like the #2 transaction keys, the #1 transaction or control keys are provided with a differential mechanism which is positioned by said keys, said differential mechanism, in turn, controlling the selection of the corresponding special counters 131, 132 and 133, to keep an accurate count of the number of times these keys are used in certain transactions, as will be explained later. The special counter 132 (Figs. 1, 2 and 3) is a Paid-Out counter and is controlled by the Paid-Out key 110 to accumulate 1 each time said key is used to initiate machine operation. The special counter 133 is a Customer counter and is controlled by the single One Item key 113 and by the Cash Total key 114, to keep an accurate count of the customers in both single-item and multiple-item transactions.

As explained previously, the #1 control key 114 has two functions, Cash Total and No-Sale, and when said control key is used in a No-Sale transaction, it causes 1 to be entered in the No-Sale special counter 131 to keep an accurate counter of the number of No-Sale transactions. All of the special counters 126 to 133 inclusive, may be reset to zero at the same time by a knob, not shown, which is accessible through a closure 134 on the righthand side of the cabinet 105. The closure 134 is provided with a lock, so that only authorized persons in possession of the key to said lock may have access to the reset knob for resetting the special counters.

In addition to selecting the corresponding special counters, the differential mechanisms for the control keys likewise control the positioning of corresponding front and back indicators 136 (Fig. 1) only the front indicators being shown herein, for indicating the type of operation being performed. Likewise the control differential mechanisms are connected to and position corresponding type wheels for printing data corresponding thereto upon issuing receipts 139 (Figs. 17 and 18), which are fed out an opening 138 provided therefor near the upper righthand portion of the cabinet 105, and for printing similar information upon a detail strip 140, a portion of which is visible through an opening in the righthand side of the cabinet adjacent the control keys. The front indicators 136 are visible through an opening 143 in the cabinet 105, and the rear indicators are visible through a similar opening in the back of the cabinet.

Like the control keys, each row of amount keys 109 (Figs. 1 and 2) is provided with a differential mechanism for positioning corresponding amount type wheels for printing amounts on the receipts 139 and the detail strip 140, and for positioning corresponding front and back indicators 137, only the front indicators shown here, said front indicators being visible through the opening 143. The Clerks' keys 120 are also provided with a differential mechanism for positioning corresponding type wheels for printing identifying letters on the receipts and the detail strip.

Inasmuch as the last several items printed on the detail strip 140 are not visible through the opening in the cabinet 105, mechanism is provided for temporarily advancing the detail strip 140 so that said last few items will be visible. The mechanism for advancing the detail strip is operated by a knob 141 mounted on the closure 134 and engageable with the advancing mechanism when said closure is in closed position, as shown in Fig. 1. Operation of the knob 141 in one direction advances the detail strip 140 against spring tension so that the last few entries thereon are visible through the opening in the cabinet. Releasing the knob 141 permits the detail strip 140 to be spring-returned to its original printing position. Means is also provided for manually advancing the web of the detail strip 140 when necessary or desirable, and this mechanism is operated by a knob 142, which extends through an opening in the closure 134.

The machine is normally operated by the usual type of electric motor, not shown but fully disclosed in the application, Serial No. 341,633, referred to before. However, in emergencies, the machine may be operated manually by means of a hand crank, not shown, which is inserted through an opening 156 provided therefor in the closure 134 (Fig. 1). A rockable shutter normally closes the opening 156.

The present machine is provided with two lines of interspersed totalizers, and in the present adaptation the #1 line, which is controlled by the keys 110 to 114 inclusive (Figs. 1 and 2), has three sets of interspersed totalizers thereon, and the #2 totalizer line, which is controlled by the keys 115 to 119 inclusive, has five sets of interspersed totalizers thereon, said totalizer lines being shiftable laterally under control of their corresponding control keys to aline the selected totalizer thereon with the amount differential mechanism for actuation thereby. Likewise, the control keys, in conjunction with the total control lever 122 control the engaging and disengaging movement of the selected totalizer and the differential mechanism for entering amounts in said selected totalizers and for the taking of totals therefrom. Each totalizer line is provided with a tens transfer mechanism for transferring tens digits from lower to higher denominations.

In addition to their other functions, the #1 control keys 110 to 114 are what are termed in this art as motorized keys in that any one of these keys, when depressed, initiate operation of the machine. Likewise the #2 control keys 115 to 119 inclusive, may also be motorized keys, if desired, depending upon the requirements of the business system to which the machine is being applied, however, in the present adaptation said #2 control keys are not motorized, but are used in conjunction with the #1 control keys.

In the ensuing pages, mechanism pertinent to the present invention will be described in detail. For a full disclosure of other mechanism of the machine, reference may be had to the patents and to the application listed at the beginning of this specification.

DETAILED DESCRIPTION

Amount keys and differential mechanisms therefor

As explained previously in connection with Figs. 1 and 2, the present machine is provided with four rows of amount keys 109, and each row of amount keys is provided with a corresponding differential mechanism comprising primary and secondary differential members for transmitting the value of the depressed key to the indicating and printing mechanisms and for setting the wheels of the selected totalizer according to the value of said depressed amount key. Inasmuch as the several amount banks are similar in construction, and are fully disclosed in the application, Serial No. 341,633, now Patent No. 2,880,930, it is believed that a general description of the amount bank, illustrated in Fig. 4, will adequately serve the present purpose.

The amount keys 109, for the denominational order disclosed in Fig. 4, are slidably mounted in a key frame, not shown, in turn supported by rods (not shown) extending between the main frames 100 and 101. Depressing one of the amount keys 109 moves the lower end of the stem thereof into the path of a projection 144 on a primary differential member 145, which together with a companion secondary differential member 146 is freely supported on a shaft 147 journaled in the main frames of the machine. The primary and secondary differential members 145 and 146 are coupled together for concert movement, at proper times, by a coupling pinion 148.

The primary and secondary differential members 145 and 146 are actuated by means of a universal rod 149, which extends through openings in said differential members and which oscillates first clockwise and back to normal position (Fig. 4), to actuate the differential mechanism. Teeth in the upper edge of the secondary differential member 146 engage corresponding teeth in an idler gear 150, which meshes with the external teeth of an external-internal transmission gear (not shown), which transmits the positioning of the secondary differential member 146 to the corresponding type wheels and indicators, in the usual and well-known manner, as fully disclosed in the application, Serial No. 341,633, now Patent No. 2,880,930.

Initial movement clockwise of the universal rod 149 permits the primary member 145, under influence of a spring 151, to follow in unison therewith until the projection 144 strikes the lower end of the stem of the depressed amount key 109 to position said primary differential member 145 according to the value of said depressed amount key. After the primary differential member 145 has been positioned, as explained above, the universal rod 149 continues its initial movement to restore the secondary differential member 146 and the mechanism connected thereto, including the corresponding type wheels and indicators, to zero position. Prior to initial movement of the primary and secondary differential members 145 and 146, the coupling pinion 148 is disengaged therefrom, so that said members are free to move independently of each other to be positioned and restored, as explained above.

After the primary differential member 145 has been positioned according to the depressed amount key 109 and the secondary differential member 146 has been restored to zero, the coupling pinion 148 is reengaged with said members to couple them together, whereupon counter-clockwise return movement of the universal rod 149 carries the primary differential member 145 from its set position to zero or home position, against the tension of the spring 151, and positions the secondary member 146 in accordance therewith. The secondary differential member 146 in turn positions the corresponding type wheels and indicators in accordance with the value of the depressed amount key 109. Teeth in the periphery of the primary differential member 145 cooperate with similar teeth in the corresponding ones of three sets of totalizer wheels 152, mounted on a #1 totalizer line 153, and with teeth in the corresponding ones of five sets of totalizer wheels 154, mounted on a #2 totalizer line 155.

In adding operations, after the primary differential member 145 has been positioned under influence of the depressed amount key 109, as explained above, the corresponding wheels 152 and 154 of the selected totalizers are engaged with said primary differential member 145, and return movement thereof rotates said selected wheels a distance in an additive direction corresponding to the value of the depressed amount key, to enter said value in said wheels. After the primary differential member 145 has arrived in home or zero position, the selected totalizer wheels are disengaged therefrom.

When no amount key 109 is depressed in the denominational order shown in Fig. 4, and being described herein as representative of all the amount banks, a zero stop bar 157, slidably mounted in the key frame, is moved inwardly from normal ineffective position into the path of the projection 144 to obstruct movement of the primary differential member 145 away from home or zero position, said primary differential member, in turn, causing the corresponding secondary differential member 146 to be positioned in zero position to position the type wheels and indicators accordingly.

In sub-total and total-taking operations, often referred to hereinafter as read and reset operations, the wheels 152 or 154 of the selected totalizer are engaged with the primary differential member 145 prior to its initial movement, which movement reversely rotates said wheel to zero position to position said primary differential member 145 according to the value on said wheel. Prior to positioning of the primary differential member 145 by the selected totalizer wheel, the coupling pinion 148 is disengaged, as explained above, to permit independent movement of said primary differential member 145 and the secondary differential member 146, said latter member being restored to zero position by the universal rod 149, as explained in connection with adding operations.

After the primary differential member 145 has been positioned by the selected totalizer wheel and the secondary differential member 146 is restored to zero position, the coupling pinion 148 is engaged to couple said differential members for concert movement, whereupon counter-clockwise return movement of the universal rod 149 returns the primary differential member 145 from set position to zero position and carries the secondary differential member 146 in unison therewith a like extent, to position the corresponding type wheels and indicators in accordance with the amount standing on the zeroized totalizer wheels. In reset operations, the wheel of the selected totalizer is disengaged from the primary differential member 145 prior to its counterclockwise return movement, and consequently said wheel remains in zeroized condition. In reading operations, the wheel of the selected totalizer is reengaged with the primary differential member 145 prior to its return movement and is restored thereby to its original position to preserve the total for further computations.

The depressed amount keys 109 (Figs. 1 and 2) are automatically released near the end of adding operations and may be manually released by depression of the release key 121 in case it is desirable or necessary. The amount keys 109 are of flexible construction, in that depression of one amount key releases a previously-depressed amount key in the same row and retains the latter depressed key in depressed position.

*Selecting and control mechanism for No. 1 totalizer line*

The first and second transaction or control banks (Figs. 1, 23 and 26) each has a differential mechanism, similar in many respects to the amount differential mechanism, explained above, said differential mechanisms comprising primary differential members (not shown) and corresponding secondary differential members 158 and 159, respectively, free on the shaft 147 and positioned in exactly the same manner as explained for the amount differentials under influence of their corresponding #1 transaction keys 110 to 114 inclusive, (Fig. 1) and #2 transaction keys 115 to 119 inclusive. The secondary differential members for the transaction banks control corresponding type wheels for printing identifying data on the detail strip 140 and on the issuing receipts 139 (Figs. 16, 17 and 18) and also control the positioning of the indicator 136 (Fig. 1), to visually indicate the data represented thereby.

As previously explained, the totalizer wheels 152 (Fig. 4) of the #1 totalizer line are rotatably supported on a sleeve 161, in turn shiftably mounted on a shift 153, supported in a framework 160, which is shiftably mounted between totalizer end plates 162, only the left-hand plate being shown here, which are in turn secured to the corresponding main frames 100 and 101.

The #1 transaction or control keys 110 to 114 inclusive, each carries a stud 163 which cooperates with corresponding camming surface formed in corresponding indentations or notches in the periphery of a shifting segment 164 (Fig. 12) free on the shaft 147, and urged counter-clockwise by a spring 171 to normally maintain a finger 172 adjacent the camming surface for the Paid-Out key 110 in yielding contact with the stud 163 for said key 110. A rearward extension of the segment 164 has a notch which engages a stud 165 in an upward extension of an arm 166 free on a stationary stud 167. The arm 166 is flexibly connected to a companion gear sector 168 by a spring 174 tensioned between said arm and said sector, which spring normally maintains a shoulder on said arm in yielding contact with a stud 169 carried by said sector 168. The teeth of the sector 168 mesh with a gear 170 free on a stationary stud 175, and integral with a spiral grooved drum cam which coacts with a shifting yoke (not shown), to shift the sleeve 161 (Fig. 4) to aline the set of totalizer wheels 152 on the #1 line corresponding to the depressed control key 110 to 114 with the corresponding primary differential members 145 for actuation thereby.

As previously explained, in multiple-item transactions, the Cash Total key 114 selects an item totalizer or itemizer on the #1 line, for clearing, and in addition actuates mechanism which automatically selects the group totalizer on the #1 line for actuation during the latter part of a Cash Total operation to cause the total amount of the multiple items cleared from the multiple item totalizer to be transferred additively into the wheels of the group totalizer. Depressing the Cash Total key 114 (Figs. 1, 2 and 12) to initiate an item total operation causes the stud 163 in said key, in cooperation with a corresponding camming surface on the segment 164 to aline the wheels of the item totalizer with the primary differential members 145 so that initial movement of said members will zeroize said item totalizer wheels. Simultaneously the stud 163, in cooperation with a camming surface on a segment 176 (Fig. 12) free on the shaft 147, and somewhat similar in outline to the segment 164, shifts said segment clockwise. The segment 176 is pivotally connected by a link 177 to a totalizer shifting arm 178 pivotally connected near its lower end to the sector 168. Clockwise movement of the segment 176 through the link 177 rocks the shifting arm 178 clockwise in unison therewith to move said arm from normal ineffective position, as shown in Fig. 12, to a position where a step formed in an opening in said arm, and corresponding to the #2 or group totalizer, is moved into coacting relationship with a stud 179 in a shifting segment 180.

After the item totalizer has been zeroized to position the primary differential members 145 in accordance with the value thereon, the item totalizer is disengaged from said primary differential members 145 and the segment 180 functions to cause the stud 179, coacting with the step on the arm 178, to shift said arm and the sector 168 downwardly to cause said sector to aline the wheels of the group totalizer with the primary differential members 145, after which said group totalizer wheels are engaged with said primary differential members 145. Return movement of the primary differential members 145 from preset position to home position enters the amount cleared from the item totalizer in the group totalizer to preserve a group or grand total of all items. Thus, the transfer of a total from one totalizer to another totalizer on the same line is effected in a single machine cycle.

*Totalizer engaging and disengaging mechanism*

Mechanism operating under control of the #1 control keys 110 to 114 (Figs. 1 and 2) and under control of the total control lever 122, is provided for controlling engaging movement of the shiftable framework 160 (Fig. 4) for the #1 totalizer line 153, to engage the selected set of totalizer wheels on said line with the primary differential members 145 in proper timing for the type of operation being performed.

Supported in the framework 160 (Figs. 4, 7 and 8) is a shaft 181, having rollers 182 on opposite ends thereof, engaged respectively by arms 183 and 184 secured on a shaft 185 journaled in the machine framework. The arm 184 has a cam slot 186 engaged by a roller 187 carried by an arm 188 free on a stud 189 extending between the right frame 100 and the right totalizer frame 162. A stud 190 supported by a downward extension of the arm 188 and a crank 191, secured to said arm, pivotally supports the rearward ends of an add engaging pitman 192 and a subtract engaging pitman 193, said pitmans being secured in properly spaced and fixed relationship to each other by a stud 194. The pitmans 192 and 193 have, respectively, enlarged forward ends with openings 195 and 196, forming totalizer engaging surfaces, which coact respectively with engaging studs 197 and 198 in similar cam levers 199 and 200 rotatably supported by a shaft 201 journaled in the machine framework. Springs 202 and 203 urge the levers 199 and 200 counter-clockwise to normally maintain rollers 204 and 205 carried thereby, in yielding contact with the edges of corresponding plate add and reset cams 206 and 207 secured on a main cam shaft 208 journaled in the machine framework and receiving one clockwise revolution of movement each machine operation.

The control surfaces in the openings in the forward ends of the pitmans 192 and 193 (Figs. 7 and 8) are positioned in relation to the corresponding operating studs 197 and 198 through the medium of a link 211, which is pivotally connected at its lower end to the pitmans 192 and 193 while the upper end of said link is slotted to receive a stud 212 in a rearward extension of a segment 213 free on a shaft 147. The segment 213 has camming lugs 214 and 215, which cooperate, respectively, with the studs 163 in the Sub-Total key 111 and the Cash Total key 114, (see also Figs. 1 and 2). A spring 216 urges the pitmans and the link 211 downwardly, and the segment 213 clockwise to normally maintain extending fingers of the camming lugs 214 and 215 in yielding contact with the corresponding studs 163.

The link 211 (Fig. 7) carries a stud 218 which engages the slot in the rearward end of a lever 219 free on a stud 220 fast in the right side frame. The forward end of the lever 219 carries a stud 221, which extends through a camming slot 222 in a segment 223 free on the shaft 147, and having an upward extension with a slot which engages a stud 224 in an arm 225 secured on a shaft 226 journaled in the machine framework. The shaft 226 is connected by mechanism, not shown, to the total control lever 122 (Figs. 1 and 2), so that operation of said total control lever will position the segment 223, thus causing the camming slot 222, in cooperation with the stud 221 to position the pitmans 192 and 193 in accordance with the position of said total control lever.

Figure 7:
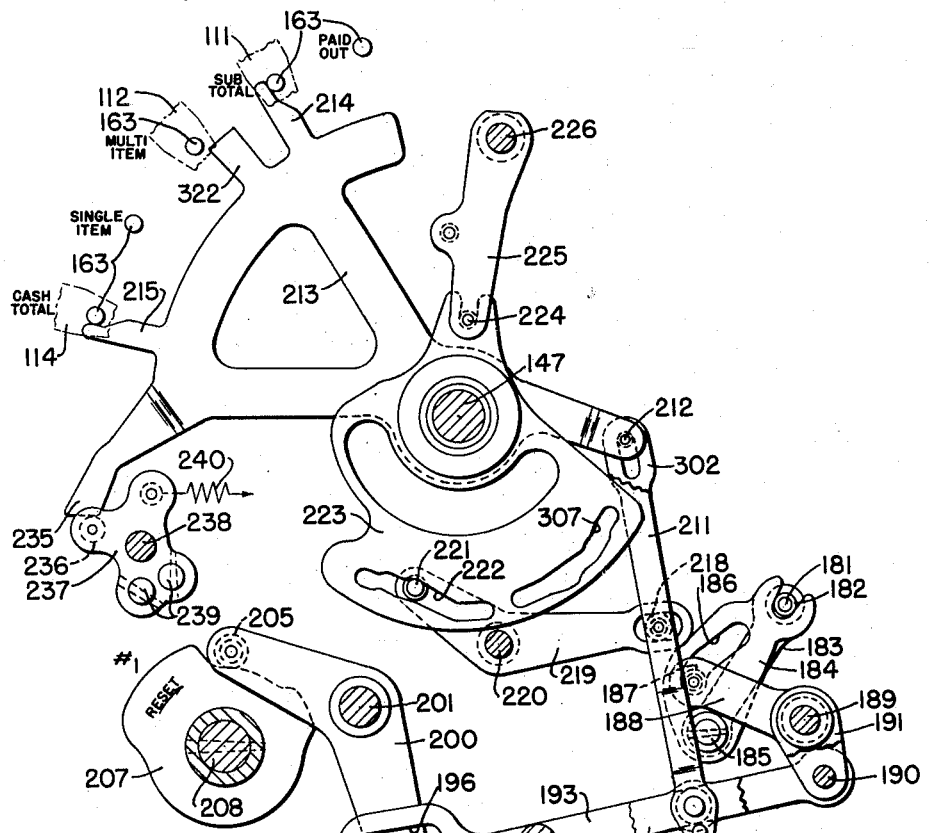
Fig. 7 is a right side elevation of a portion of the mechanism for controlling the engaging and disengaging movement of the #1 totalizer line in total-taking operations.

When the total control lever 122 is in normal or Register position, the segment 223 is positioned as shown in Fig. 7, which, in turn, locates the pitmans 192 and 193 in their lowermost position, as here shown. The positioning of the pitmans 192 and 193 in their lowermost position, under normal conditions, causes the selected set of wheels on the #1 totalizer line 153 to be engaged with the amount actuators in add timing. Moving the total control lever 122 to #1 Read position causes the segment 223 (Figs. 7 and 8) to position the pitmans 192 and 193 in their second position whereupon operation of the cams 206 and 207 causes the selected set of wheels on the #1 totalizer line to be engaged with the primary differential members 145 in read timing. Moving the total control lever 122 to #1 Reset position locates the pitmans 192 and 193 in their third position, whereupon operation of the cams 206 and 207 causes the selected set of totalizer wheels on the #1 totalizer line to be engaged with the primary differential members 145 in reset timing.

The mechanism just described imparts engaging movement only to the #1 totalizer framework, and separate means, shown in Fig. 13, is provided for imparting disengaging movement to said framework. The stud 190 in the crank 191 (Fig. 13) engages a slot in the rearward end of a link 227, the forward end of which is pivoted on a stud 228 in a cam arm 229 free on the shaft 201 and urged clockwise by a spring 232 to normally maintain a roller 230 carried thereby, in yielding contact with the camming edge of a disengaging cam 231 secured on the main cam shaft 208 and receiving one clockwise revolution of movement each machine operation.

Figure 8:
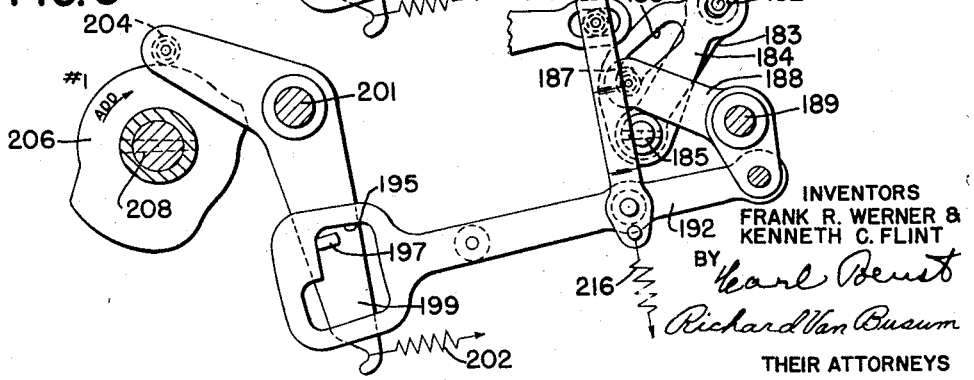
Fig. 8 is a detail view of a portion of the mechanism for controlling the engaging and disengaging movement of the #1 totalizer line in adding operations.

When the total control lever 122 is in Register position and the pitmans 192 and 193 are positioned in their lowermost position, as shown in Figs. 7 and 8, operation of the reset cam 207 will have no influence on the reset pitman 193, as the stud 198 is opposite a clearance portion of the opening 196, and as a result said stud will operate idly without moving the pitman 193.

Operation of the add cam 206 (Fig. 8) and its associated lever 199 will cause the stud 197, in cooperation with the raised portion of the opening 195 to shift the pitman 192 forwardly, after the primary differential members 145 have been positioned under influence of the depressed amount keys, as explained earlier herein, to cause the #1 totalizer framework to receive inward engaging movement to engage the selected set of totalizer wheels on the #1 totalizer line with the primary differential members 145, prior to their return movement, which movement revolves said selected wheels in an additive direction to add the value of the effective amount keys therein. Near the end of an adding operation the mechanism shown in Fig. 13, and explained above, imparts rearward or disengaging movement to the #1 totalizer framework to disengage the selected set of wheels from the primary differential members.

Moving the total control lever 122 to its Read 1 position moves the pitmans 192 and 193 upwardly one step to where an inwardly-extending portion of the opening 196 in the pitman 193 is opposite the operating stud 198, and the raised surface in the opening of the pitman 192 is still in coacting relationship with the stud 197. Initial movement of the reset cam 207 (Figs. 7 and 8) causes the stud 198, in cooperation with the raised surface, to shift the pitmans 193 and 192 forwardly, as it will be recalled that these two pitmans are connected together for unitary movement and move in unison at all times. Forward movement of the pitman 193 rocks the #1 totalizer framework inwardly to engage the selected set of totalizer wheels with the primary differential members 145 prior to their initial movement, which movement rotates said wheels in a reverse direction to zero, to position the indicators and type wheels according to the amount standing thereon. After the primary differential members have completed their initial movement, the totalizer disengaging mechanism shown in Fig. 13 functions in synchronism with the movement of the reset cam 207 to shift the #1 totalizer framework rearwardly to disengage the zeroized totalizer wheels from the primary differential members. Immediately after the totalizer wheels have thus been disengaged, the add cam 206 becomes effective and shifts the pitmans 192 and 193 forwardly to reengage the selected totalizer wheels with the primary differential members prior to their return movement, which movement restores said selected totalizer wheels to their original condition to preserve the amount in the totalizer for use in further computations.

Moving the total control lever 122 to #1 Reset position, through the mechanism shown in Figs. 7 and 8, lifts the pitmans 192 and 193 upwardly two steps from Register position, to reset position in which the extending portion of the control opening 196 in the pitman 193 is still in the path of the stud 198, and in which a clearance portion of the opening 195 in the add pitman 192 is located opposite the stud 197. Therefore, in reset operations, the reset pitman 193 will function as explained before to engage the selected totalizer wheels with the primary differential members 145 prior to their initial movement, which movement reversely rotates said wheels to zero. In reset operations, after the selected set of totalizer wheels has been reversely rotated to zero, and prior to return movement of the primary differential members 145, the totalizer disengaging mechanism shown in Fig. 13 functions, as explained before, to disengage the selected totalizer wheels from the primary differential members 145 prior to their return movement. Inasmuch as there is a clearance portion of the control opening 195 in the pitman 192 opposite the stud 197, operation of the add cam 206 will cause the stud 197 to operate idly in said clearance portion of the opening without shifting the pitman 192 forwardly, and consequently, in reset operations the selected totalizer wheels are not reengaged with the primary differential members, and as a result remain in a zeroized condition.

Moving the total control lever 122 to Locked Register position raises the pitmans 192 and 193 (Fig. 7) to their uppermost position, in which position clearance portions of the openings 195 and 196 are in the path of corresponding studs 197 and 198, so that under this condition no engaging movement is imparted to the #1 totalizer framework.

As previously explained, the #1 totalizer line has three complete sets of totalizers thereon, said three sets comprising a Paid-Out totalizer, an Item totalizer, and a Group totalizer, which totalizers are selected for engagement with the primary differential members 145 under control of their corresponding Paid-Out key 110, Multiple Item key 112, and Cash or Total key 114, which keys operate through the mechanism shown in Fig. 12 to aline said corresponding totalizers with said primary differential members.

Depressing the Sub-Total key 111 (Fig. 12) in addition to alining the item totalizer with the primary differential members, also in cooperation with the lug 214 (Fig. 7) shifts the segment 213 counter-clockwise, which through the link 211 lifts the pitmans 192 and 193 one step upwardly to Read position to cause said item totalizer to be read or sub-totalized. Counter-clockwise movement of the segment 213 (Fig. 7) causes a downward extension 235 thereof, in cooperation with a stud 236 in an arm 237, free on a key release and lock shaft journaled in the main framework, to rock said arm counter-clockwise against the tension of a spring 240. The arm 237 is connected by two rods 239 with locking arms (not shown) also free on the shaft 238, and rockable in unison with said arm 237 to lock the flexible detents for the amount banks against movement to prevent depression of the amount keys in sub-total operations.

Depressing the Cash Total key 114 causes the stud 163 therein in cooperation with the lug 215 to rock the segment 213 counter-clockwise exactly the same as the Sub-Total key 111 to select and condition the item totalizer for a reading operation and to lock the amount keys against depression. However said item totalizer is disengaged from the primary differential members after having been zeroized thereby and remains in a zeroized condition due to operation of the automatic transfer total mechanism shown in Fig. 12. Depression of the Cash Total key 114 rocks the segment 176 clockwise to shift the arm 178 also clockwise to position the control surfaces in the opening in said arm in relation to the stud 179 so that initial movement counterclockwise of the segment 180 after the item totalizer has been zeroized as explained above, will shift the #1 totalizer line to aline the group totalizer with the primary differential members. Inasmuch as the pitman 192 (Fig. 8) is located in Read position, operation of the add cam 206 will shift said pitman forwardly to engage the group totalizer with the primary differential members prior to their return movement, which movement enters the amount cleared from the item totalizer in said group totalizer to preserve a grand total of all items.

The #1 totalizer line is provided with a tens transfer mechanism for transferring tens digits from lower to higher denominations, said transfer mechanism being common to the three sets of totalizer wheels on the #1 totalizer line, and coacting therewith when said wheels are alined with the primary differential members 145 for actuation thereby. The tens transfer mechanism functions in reading and resetting operations to coact with the long teeth of the selected totalizer wheels to stop said wheels in zero position and said wheels, in turn, position the corresponding primary differential members accordingly.

The selecting and conditioning mechanism for the #1 totalizer line, explained in somewhat general terms above, is fully disclosed in the co-pending application, Serial No. 341,633, to which reference may be had for a more detailed description of this mechanism, if necessary or desired.

*Selecting and control mechanism for the #2 totalizer line*

As previously explained, the #2 totalizer line is similar in construction and operation to the #1 totalizer line, and comprises five sets of totalizer wheels 154 (Fig. 4) corresponding to the five #2 control keys 115 to 119 (Figs. 1 and 2) and alined by the depression of said keys with the primary differential members for actuation thereby.

The five sets of #2 totalizer wheels 154 (Fig. 4) are rotatably mounted on a sleeve 241, in turn slidably supported by the #2 totalizer line or shaft 155, said shaft in turn supported by a #2 totalizer framework 242, which is shiftably mounted between the right and left totalizer main frames 162. Mounted to slide on the shaft 155 (Fig. 11) in unison with the sleeve 241, is a shifting collar 243 having an annular groove engaged by the tines of a shifting fork 244 free on a shifting rod 245 shiftably supported by the frames 162, said shifting fork being confined between collars secured to said rod 245 so that it will shift laterally in unison therewith. Secured on the righthand end of the rod 245 is a shifting block 246 having a slot which slidably engages a fixed stud 247 to hold said block and said rod against rotation.

The block 246 carries a screw stud 248 which engages a helical shifting groove in a shifting cam 249 rotatably supported on a stud 250 secured in the right frame 162. Secured to the left face of the shifting cam 249 is a pinion 251 engaged by teeth in a shifting sector 252 free on the shaft 147, and having a slot engaged by the rounded inner arm of a lever 253 rotatably supported by a stationary stud 254. The forward arm of the lever 253 has a slot which engages a stud 255 in a selecting plate 256 rockably supported by companion arms 257 and 258, in turn rotatably supported by studs 259 secured in the frame for the second transaction bank. The plate 256 has five shifting notches 262 (Fig. 11) arranged to coact respectively with corresponding studs 263 in the #2 control keys 115 to 119 inclusive, only one of which may be depressed at a time.

Depression of one of the keys 115 to 119 causes its stud 263, in cooperation with the corresponding shifting notch 262 to rock the plate 256 an extent corresponding to the depressed key. The movement of the plate 256 is transmitted by the lever 253 to the sector 252 to rotate the cam 249 to cause the groove therein, in cooperation with the stud 248, to shift the rod 245, the fork 244, the sleeve 241 (Fig. 4), and the totalizer wheels 154 to aline the set of totalizer wheels corresponding to the depressed key 115 to 119 with the primary differential members 145 for actuation thereby.

From the foregoing description it should be understood that the act of depressing the control keys 115 to 119 alines the corresponding set of totalizer wheels 154 on the #2 totalizer line with the primary differential members 145, and the totalizers on the #1 totalizer line 153 (Fig. 12) are selected in a similar manner.

Means is provided to retain the sector 252 (Fig. 11) and connected mechanism in set position during machine operation, and this mechanism comprises an aliner 264, arranged to engage teeth in a downward portion of said sector 252. The aliner 264 is free on a stud 265 in the right side frame and has secured in fixed relationship thereto a downwardly-extending arm 266, said arm and said aliner being urged clockwise by a spring 267 to normally maintain the forward edge of said arm 266 in yielding contact with a stud 268, extending between the disengaging link 227 (Figs. 13 and 14) for the #1 totalizer line and a similar link 269 for the #2 totalizer line, said links being similar in outline and operating in unison to disengage their corresponding totalizers, as explained previously for the #1 totalizer and as will be explained presently for the #2 totalizer line. The aliner 264 functions according to the operation of the disengaging cam 231 (Fig. 13) to engage and disengage the teeth in the sector 252 to retain said sector and connected parts, including the sleeve 241 (Fig. 4), supporting the #2 totalizers, in set position during the periods of machine operation in which the selected set of #2 totalizer wheels are engaged with the primary differential members, for actuation thereby.

An alining mechanism, shown in Fig. 6, is provided for alining the shifting rod 245 for the #2 totalizer line in set position during machine operation, so that the selected set of totalizer wheels on the #2 totalizer line will remain in accurate alinement with the primary differential members.

Secured on the #2 shifting rod 245 (Figs. 6 and 11) are three alining disks 560, the teeth of which are arranged to be engaged by similar teeth in an alining block 561, secured on the outer end of an arm 562, free on a stationary stud 563. The arm 562 is connected by a link 564 to a similar arm 565 for the #1 totalizer line, free on a stationary stud 566. The arm 565 carries an alining block 567, which coacts with corresponding alining disks 568, secured on the #1 totalizer-shifting rod. The arm 565 is connected by a link 569 to a cam lever (not shown), which, in cooperation with corresponding cams (not shown), operates the alining arms 562 and 565 in proper timing to retain the corresponding selected sets of totalizer wheels on the #1 and #2 totalizer lines in accurate alinement with the primary differential members while said selected wheels are engaged therewith.

The mechanism for operating the aliner arm 565 for the #1 totalizer line is fully disclosed in the application, Serial No. 341,633, now Patent No. 2,880,930, to which reference may be had for a more complete description of this mechanism.

*Engaging and disengaging mechanism for the #2 totalizer line*

Mechanism similar to that described for the #1 totalizer framework is provided for imparting engaging movement to the #2 totalizer framework, to engage the selected set of totalizer wheels thereon with the primary differential members 145 in accordance with the type of operation being performed. The totalizer disengaging mechanism shown in Fig. 13 and explained before, also functions to impart disengaging movement to the #2 totalizer framework in exactly the same manner as explained for the #1 totalizer framework.

The #2 totalizer framework 242 (Fig. 4) supports a shaft 270, opposite ends of which carry rollers 271 which coact with slots in the frames 162 to assist in shiftably supporting said framework 242. The rollers 271 are engaged, respectively, by slots in the upper ends of arms 272 and 273 secured on a shaft 274 journaled in the totalizer frames 162. The arm 273 (Fig. 9) has a cam slot 275 engaged by a roller 276 carried by an arm 277 free on a rod 278 extending through the machine framework, said arm 277 being integral with a crank 279, having pivotally connected thereto the upper end of a link 280. The lower end of the link 280 is pivotally connected to a stud carried by a bell crank 283 free on the stud 189, and with the assistance of a companion crank 293 supports a stud 282 in turn pivotally supporting the rearward ends of an add-engaging pitman 284 and a reset-engaging pitman 285. A stud 286 (Figs. 9 and 10) extends between the pitmans 284 and 285, and properly spaces said pitmans apart and secures them in fixed relationship to each other.

The add pitman 284 has an opening 287 in an enlarged forward end thereof, said opening having control surfaces on its forward edge, which cooperate with an operating stud 289 secured in a lever 291 free on the shaft 201. The lever 291 carries a roller 293 and a spring 297 urges said lever counter-clockwise to maintain said roller in yielding engagement with the operating edge of an add plate cam 295 secured on the main cam shaft 208. The reset-engaging pitman 285 (Fig. 10) has an opening 288 in an enlarged forward end thereof, said opening having control surfaces on its forward edge, which cooperate with an operating stud 290 fast in a lever 292 free on the shaft 201, and urged counter-clockwise by a spring 293 to normally maintain a roller 294 carried thereby, in yielding contact with the operating edge of a reset plate cam 296 secured on the main cam shaft 208, which shaft, it will be recalled, makes one clockwise revolution each machine operation. Secured between the pitmans 284 and 285 is a stud 301 which pivotally supports the lower end of a link 302, the upper end of which is slotted to receive the stud 212 in the segment 213 (Figs. 7 and 9). The link 302 is similar in outline to the corresponding link 211 for the #1 totalizer line, and operates in a similar manner to control the positioning of the pitmans 284 and 285.

The link 302 (Fig. 9) carries a roller 303 engaged by a slot in the rearward end of an arm 304 free on the stud 220 and integral with a companion crank 305 having a stud 306 which engages a control slot 307 in the segment 223, which it will be recalled is positioned under control of the total control lever 122 (Figs. 1 and 2). The control slot 307 functions exactly like the slot 222 for controlling the positioning of the pitmans 284 and 285 for the #2 totalizer line.

When the total control lever 122 is in its normal or Register position, as here shown, the segment 223 is positioned as shown in Fig. 9, causing the slot 307, in cooperation with the stud 306 and the link 302 to position the pitmans 284 and 285, as here shown, (see also Fig. 10) to cause the selected set of wheels on the #2 totalizer line to be engaged with the corresponding primarily differential members 145 (Fig. 4) in add timing. Moving the total control lever 122 to Locked Register position advances the segment 223 one step in a clockwise direction, causing the slot 307 and associated mechanism to lift the pitmans 284 and 285 one step, to where clearance portions of the openings 287 and 288 are opposite the corresponding studs 289 and 290, and therefore, operation of the cams 295 and 296, and their corresponding levers 291 and 292 will impart no engaging movement to the pitmans 284 and 285, and as a result, the #2 totalizer framework will remain in disengaged position.

Moving the total control lever 122 to Read 2 position, causes the pitmans 284 and 285 to be lifted two steps, to where operating portions of the openings 287 and 288 are opposite the studs 289 and 290, whereupon operation of the cams 295 and 296 causes the selected set of wheels on the #2 totalizer line to be engaged with the corresponding primary differential members 145 in read timing, in exactly the same manner as explained for the #1 totalizer line. Moving the total control lever 122 to Reset 2 position causes the pitmans 284 and 285 (Figs. 9 and 10) to be lifted three steps to move a clearance portion of the opening 287 in the add pitman 284 opposite the stud 289, and to move an operating portion of the reset pitman 285 opposite the stud 290 so that operation of the cams 295 and 296 causes the selected set of wheels on the #2 totalizer line to be engaged with the primary differential members 145 in reset timing.

Disengaging movement is imparted to the #2 totalizer framework by the same mechanism which imparts disengaging movement to the #1 totalizer framework, said mechanism being shown in Figs. 13 and 14. As previously explained, the disengaging link 227 for the #1 totalizer line is connected in fixed relationship to the similar disengaging link 269 for the #2 totalizer line by the studs 228 and 268. The rearward end of the link 269 (Fig. 14) is slotted to embrace the stud 282 in the bell crank 281, and as a result, disengaging movement of the cam 231 is imparted to the #2 totalizer framework through said link 269, the bell crank 281, and the link 280 (see also Figs. 9 and 10) in exactly the same manner as explained previously in connection with the #1 totalizer line.

Depressing either the Sub-Total key 111 or the Cash Total key 114 (Figs. 2, 7, 8 and 9), rocks the segment 213 counter-clockwise, as explained before, which through the link 302, lifts the pitmans 284 and 285 one step to Locked Register position, to render the engaging mechanism for the #2 totalizer line inoperative when either of these keys is depressed. It should be understood that when the total control lever 122 is in Register position the control slot 307 (Fig. 9) has sufficient clearance for the stud 306 to permit positioning movement of the pitmans 284 and 285 under influence of the segment 213, as explained above. This also applies to the similar mechanism shown in Fig. 7, for the #1 totalizer line, as similar clearance is provided in the slot 222 for the stud 221. As explained in connection with the #1 totalizer line, counter-clockwise movement of the segment 213 rocks the arm 237 also counter-clockwise, against the action of its spring 240, to lock the amount keys against depression under these conditions.

A spring 308 tensioned between the lower end of the link 302 and a stationary stud urges said link and the pitmans 284 and 285 downwardly to normally maintain said parts in Register position.

Depressing the Paid-Out key 110 (Figs. 9 and 10) causes the stud 163 in the stem thereof, in cooperation with a camming lug 309 on a segment 310 free on the shaft 147, to rock said segment counter-clockwise. Counter-clockwise movement of the segment 310 causes a foot-shaped downward extension 311 thereof, in cooperation with a roller 312 carried by the link 302, to lift said link against the tension of the spring 308 to raise the #2 engaging pitmans 284 and 285 one step to Locked Register position, to prevent engaging movement being imparted to the #2 totalizer line when said Paid-Out key is depressed.

The #2 totalizer line is provided with a tens transfer mechanism for transferring tens digits from lower to higher denominations, said tens transfer mechanism being common to the five sets of totalizers on said #2 totalizer line, and coacting with the wheels of each of said totalizers, when they are moved into alinement with the primary differential members 145 for actuation thereby.

The tens transfer mechanism for the #2 line is identical to that provided for the #1 totalizer line which, as previously explained, is fully disclosed in the co-pending application, Serial No. 341,633, now Patent No. 2,880,930, and comprises a transfer pawl 570 (Fig. 5) for each denominational order for transferring tens digits from lower to higher denominations. In sub-total and total operations, often referred to as read and reset operations, the wheels of the selected totalizer are reversely rotated until stopped by long teeth thereon coming in contact with the edge of a corresponding stop bail (not shown) to position said wheels in zero and to in turn adjust the primary differential members accordingly.

During the time that the selected totalizer wheels are being reversely rotated, it is necessary that the transfer pawls 570 (Fig. 5) be retained out of the path of the teeth of said wheels so as not to interfere with their rotation. The transfer pawls 570 for the #2 totalizer line each has a downward projection 571 arranged to be engaged by a corresponding slot in a bar 572 supported at each end by corresponding arms 573 in turn pivotally mounted on trunnion studs 574 secured in the machine framework. The lefthand arm 573 is pivotally connected by a link 575 to a corresponding left arm 576 for the #1 totalizer line, which, with a corresponding right arm 576 are rotatably supported on corresponding trunnion studs 577 secured in the machine framework. The arms 576 support a bar 578 with slots which engage downward projections on the corresponding #1 transfer pawls (not shown) similar in every respect to the transfer pawls 570 for the upper or #2 totalizer lines. The left arm 576

(Fig. 5) is pivotally connected by a link 579 to a stud 580 (Fig. 7) in the #1 reset cam lever 200 for the #1 totalizer line. The lever 200 functions in proper timing to engage the slots in the bars 572 and 578 (Fig. 5), with the projections 571 on the transfer pawls 570 to retain said pawls in fully disengaged position so that the teeth thereof will not stumble on the teeth of the wheels of the selected totalizer on the #1 and #2 totalizer lines.

For a full disclosure of the mechanism for retaining the transfer pawls for the #1 totalizer line in disengaged position during reading and resetting operations, reference may be had to the application, Serial No. 341,688.

The total control lever 122 (Fig. 2) controls the positioning of a #2 locking plate 313 (Fig. 15) to lock the #2 control keys 115 to 119 against depression when said total control lever is in certain positions. The plate 313 is free on the shaft 147, and has a slot which engages a stud 314 in an arm 315 secured on the shaft 226, which, it will be recalled, is operated by the total control lever 122. The mutilated periphery of the locking plate 313 cooperates with the studs 263 in the stems of the control keys 115 to 119 for the #2 totalizer line.

When the total control lever 122 is in Register position, the locking plate 313 is positioned as shown in Fig. 15, in which clearance portions of the periphery thereof are opposite the studs 263, and consequently any of the #2 control keys 115 to 119 may be depressed to select the corresponding set of totalizer wheels on the #2 totalizer line. Moving the total control lever to Locked Register position rocks the plate 313 one step in a clockwise direction to move obstructing portions of the periphery thereof into the path of all of the studs 263 to obstruct depression of any of the #2 control keys under this condition. Moving the total control lever 122 to either Read 2 or Reset 2 position imparts, respectively, either two or three steps of movement to the plate 313 in a clockwise direction, in either of which positions clearance portions of the periphery of said plate permit depression of the #2 control keys 115 to 119 inclusive, to select the corresponding totalizers on the #2 line for either read or reset operations. Moving the total control lever 122 (Fig. 2) to either Read 1 or Reset 1 position imparts, respectively, either one or two steps of movement to the plate 313 (Fig. 15) in a counter-clockwise direction, to move obstructing portions of the periphery of said plate in the path of the studs 263 to obstruct depression of the #2 control keys, when said total control lever is thus positioned. Positioning of the locking plate 313 by the total control lever 122 when either in Read 1 or Reset 1 position, locates a lug 316 on the periphery thereof in the path of a stud 317 in the arm 257 (Figs. 11 and 15) for the #2 selecting plate 256 to maintain the proper alinement of said selecting plate 256 and connected parts shown in Fig. 11, under these conditions.

A locking plate 318 (Fig. 19) is provided for the #1 control keys 110 to 114 (Fig. 2) which plate operates similarly to the plate 313 for the #2 control keys (Fig. 15) for controlling the depression of said #1 keys.

The plate 318 has a slot engaged by a stud 319 in arm 320 secured on the shaft 226, which shaft, it will be recalled, is positioned under control of the total control lever 122 (Fig. 2). The mutilated periphery of the locking plate 318 cooperates with the studs 163 in the #1 control keys 110 to 114 inclusive, to control depression of these keys, depending upon the position of the total control lever. The single item key 113 is used to initiate machine operation when the #2 control keys 115 to 119 are being used to select the corresponding totalizers on the #2 totalizer line in reading and resetting operations, as it will be recalled that the #2 control keys are not motorized and hence do not initiate machine operation. Consequently, the only time the single Item key is locked against depression is when the total control lever 122 is in Locked Register position, as will be explained presently.

When the total control lever 122 is in Register position, the locking plate 318 is positioned as shown in Fig. 19, in which clearance portions of the periphery thereof are opposite the studs 163 for the #1 control keys 110 to 114 inclusive. When the total control lever 122 is moved to either one or two steps respectively in a counter-clockwise direction to move obstructing portions of the periphery thereof opposite the studs 163 in the Sub-Total key 111, the Multiple Item key 112, and the Total Cash key 114, and therefore, only the Paid-Out key 110 and the Single Item key 113 may be depressed under either of these conditions to select the group totalizer on the #1 line for read or reset operations.

Moving the total control lever to Locked Register position advances the locking plate 318 (Fig. 19) one step in a clockwise direction to lock all of the #1 control keys against depression. The single Item key 113 is locked against full depression and thus rendered ineffective when the total control lever 122 is in Locked Register position, by a short projection 321 (Fig. 19) in cooperation with the stud 163 in said key. The projection 321 is located in the bottom of the large opening in the periphery of the plate 318, which opening provides clearance for the stud 163 to permit depression of the Single Item key at all times except when the total control lever 122 is in Locked Register position.

Moving the total control lever 122 to either Read 2 or Reset 2 position advances the locking plate 318 either two steps or three steps respectively, in a clockwise direction to lock all of the #1 control keys against depression, with the exception of the Single Item key 113 which is used in this case, in conjunction with the #2 control keys 115 to 119, as explained before, to initiate machine operation to read and reset the corresponding totalizers on the #2 totalizer line.

By referring to Fig. 7 it will be seen that counter-clockwise movement of the segment 213, upon depression of either the Sub-Total key 111 or the Cash Total key 114 moves a projection 322 beneath the stud 163 in the Multiple Item key 112 to obstruct the depression of said key when either of the above keys is depressed.

An interlocking mechanism is provided between the two rows of control or transaction keys to insure proper operation of the machine, and this interlocking mechanism comprises a control plate 323 (Fig. 20) which is rockably supported by a crank 324 and an arm of a bell crank 325 in turn pivotally supported by the studs 259. A spring 328 urges the control plate 323 upwardly or counter-clockwise to normally maintain the rearward edge thereof in yielding contact with a stop stud 329 secured in the control key framework.

A downward extension of the bell crank 325 (Fig. 20) cooperates with an ear 331 bent outwardly from an arm 332 secured on the key release and lock shaft 238. Under normal conditions, when the total control lever is in Register position, and none of the control keys are depressed, the extension of the bell crank 325 lies in the path of the ear 331, as shown here, to obstruct clockwise machine releasing movement of the shaft 238. Depressing any one of the #2 control keys 115 to 119 (Figs. 2 and 20) causes the stud 263 therein, in cooperation with an angular camming surface on a corresponding camming lug 333 on the control plate 323, to shift said control plate downwardly or clockwise, against the action of the spring 328, to rock the bell crank 325 also clockwise, to move the downward extension of said bell crank out of the path of the ear 331 to free the arm 332 and the shaft 238 for clockwise machine releasing movement.

Depressing any one of the #1 control keys 110, 111 or 114 (Figs. 2 and 20) causes the stud 163 therein, in cooperation with an angular camming surface on a corresponding lug 334 on the control plate 323, to rock said plate downwardly or clockwise a greater extent than the downward movement imparted to said control plate by the #2 control keys, to rock the lower end of the bell crank 325 out of the path of the ear 331, to free the shaft 238 for clockwise machine releasing movement, and to simultaneously move stop shoulders 335 adjacent said camming surfaces on the lugs 334 beneath the pins 263 of the #2 control keys 115, 116 and 119, to obstruct depression of said control keys. This movement of the plate 323 also moves projections 336 and 337 thereon beneath the studs 263 of the #2 control keys 117 and 118 to obstruct depression of all of the #2 control keys when the #1 control keys, recited above, are depressed.

It will be noted that when any one of the #2 total control keys is depressed, clearance portions of the periphery of the control plate 323 are located opposite the studs 163 in the Multiple Item key 112 and the Single Item key 113, so that either of these keys may be used in conjunction with the #2 total keys, which is a desirable and necessary feature for the proper adaptation of the machine to certain business systems. Depressing any one of the #1 control keys 110, 111 or 114, moves a stop shoulder 338 on the control plate 323 in the path of the stud 163 for the Multiple Item key 112, to obstruct depression of said key, in conjunction with the above-named #1 control keys. Likewise, depressing the Multiple Item key 112 moves the stud 163 in the path of the wall adjacent to the shoulder 338 to obstruct depression of the #1 control keys 110, 111 or 114.

Moving the total control lever 122 (Fig. 2) to either Read 1 or Reset 1 position rocks the shaft 226 (Fig. 20) and the arm 225 clockwise, causing a stud 339 in said arm, in cooperation with a downward extension of the control plate 323, to shift said plate downwardly or clockwise against the action of the spring 328, to move the lower end of the bell crank 325 out of the path of the ear 331, so that releasing movement clockwise of the shaft 238 will not be obstructed.

A combination locking and control detent 340 (Fig. 21) is provided for the two rows of control keys, said detent being constructed to latch the #2 control keys in depressed position, and being flexible in that the depression of one control key releases a formerly depressed #2 control key, and so on. The flexible detent 340 is rockably supported by a crank 341 and a bell crank 342, both of which are rotatably mounted on the studs 259 carried by the control key framework. The detent 340 has five locking extensions 343, which cooperate with the studs 263 in the #2 control keys 115 to 119 inclusive (Fig. 2). Each of the extensions 343 is provided with an angular camming surface near its outer end, which cooperates with the corresponding stud 263 when the related control key is being depressed, to shift the detent downwardly or clockwise, against the action of a spring 344, to in turn rock the bell crank 342 also clockwise, to move a downwardly projecting finger 345 thereof into the path of the ear 331 to obstruct clockwise releasing movement of the arm 332 and the shaft 238, when one of the #2 control keys is partially depressed. Full depression of the control key moves the corresponding stud 263 beyond a shoulder 348 near the lower end of the corresponding extension 343, whereupon the spring 344 returns the detent 340 upwardly or counter-clockwise to latch the key in depressed position and to restore the bell crank 342 to the position shown in Fig. 21, where the finger 345 is inside of the ear 331 and consequently, the arm 332 and shaft 238 are free to move in a clockwise direction to initiate machine operation.

Upon clockwise releasing movement of the arm 332, the ear 331 moves in the path of a rounded outer surface of the finger 345 to secure the detent 340 in the position here shown, to lock the depressed #2 control key against release and to obstruct depression of any other #1 or #2 control key during operation of the machine. Near the end of machine operation, restoring movement counter-clockwise of the shaft 238 and the arm 332, causes a forward surface on said arm to engage a stud 346 in the downward arm of the bell crank 342 to rock said bell crank and the flexible detent 340 clockwise against the action of the spring 344 to disengage the shoulder 348 from the stud 263 of the depressed #2 control key, to free said key for restoring movement upwardly, under influence of its spring.

The flexible detent 340 (Fig. 21) is provided with three camming extensions 347, which cooperate with the pins 163 in the #1 control keys 110, 111 and 114 (Fig. 2) so that depression of any one of these keys will shift the detent downwardly against the action of the spring 344, to release any previously-depressed #2 control key, as it is undesirable that these keys be used in conjunction with each other. It will be noted that no camming extension 347 is provided for the pins 163 for the #1 control keys 112 and 113, as these keys are intended to be used in conjunction with the #2 control keys to properly control operation of the machine.

In certain adaptations of the machine, it is desirable that the #2 control keys be, what is termed, stay-down keys, and not automatically released by the arm 332 (Fig. 21) in cooperation with the stud 346, near the end of machine operation, as explained above. To accomplish this, the stud 346 is omitted from the bell crank 342, and operation of the Single Item key 113 is arranged to shift the detent 340 downwardly or clockwise to release the depressed #2 control keys near the end of operations in which said Single Item key 113 is used. The stud 163 in the Single Item key 113 has pivotally connected thereto the upper end of a floating finger 349 (Figs. 21 and 22) having a camming surface 350 on one edge and a shoulder 351 adjacent thereto, which cooperate with a pawl 352 pivoted on a headless stud 353 in an upward extension of a bracket 354 secured to an arcuate plate 355, in turn secured to the control bank key frame by screws 356. A spring 357 tensioned between a large-headed stud 358 carried by the pawl 352, and a stationary stud, urges said pawl clockwise to normally maintain a shoulder formed on the head of the stud 358 in yielding contact with a shoulder formed on the upward extension of the bracket 354, as shown in Fig. 22. The large head of the stud 358 also cooperates with the upward extension of the bracket 354 to retain the pawl 352 on the headless stud 353. Under normal conditions gravity retains the floating finger 349 in contact with a stud 359 in the flexible detent 340 (Fig. 21).

In Fig. 21 the key 113 is shown in undepressed position, in which the shoulder of the finger 349 is above the pawl 352. Depression of the key 113 causes the shoulder 351 to by-pass the pawl 352, as shown in Fig. 22, and brings the camming surface 350 into coacting relationship with the rounded end of said pawl 352. Return movement upwardly of key 113 and the finger 349, under action of the restoring spring for said key, causes the cam surface 350, in cooperation with the rounded nose of the pawl 352, to rock the finger 349 clockwise causing the forward edge thereof, in cooperation with the stud 359, to shift the flexible detent 340 downwardly or clockwise to release the depressed #2 control key simultaneously with the upward restoring movement of the Single Item key 113.

As previously explained, when the mechanism shown in Fig. 22 is used to release the depressed #2 control key, the stud 346 is omitted from the downward extension of the bell crank 342 to render the automatic releasing mechanism inoperative, and as a result, when the Multiple Item key 112 is used in conjunction with the #2 control keys, the depressed #2 control key will remain depressed at the end of machine operation, as there is no provision on said key 112 for shifting the flexible detent 340 forwardly, and thus is provided a desirable stay-down feature for the #2 control keys, which is useful in connection with certain business systems.

It is believed that a description of the Multiple Item and Single Item transactions, in which the receipts shown in Figs. 17 and 18 were prepared, will provide a sufficient description of the operation of the machine for the purpose of this application.

In preparing the Multiple Item receipt, shown in Fig. 17, it will be remembered that the data at the top of the sheet, including the name of the Company, the consecutive number, and the date, were printed in the previous operation, as is the usual practice in this type of machine.

It will be recalled that a Multiple Item transaction consists of several item-entering operations and a final Total Cash operation in which the total of the several items is printed on the receipt. In preparing the receipt shown in Fig. 17, the first amount, "$6.66," is set up on the amount keys 109 (Figs. 1 and 2), the #2 control key 116 depressed, and the Multiple Item key 112 in the first transaction row depressed to initiate machine operation. During this operation the amount of the first item is printed on the first line of the receipt (Fig. 17), and an identifying symbol "II" for the control key 116 is printed immediately to the right of said item. Next the second item, "$7.77" is set up on the amount keys and the #2 control key 115 is depressed, and as before, the Multiple Item key 112 is depressed to initiate machine operation, during which the amount of the second item is printed on the receipt (Fig. 17) and an identifying symbol "I" is printed immediately to the right of said amount to identify the item. During these item-entering operations, the amount of the item is entered in the corresponding totalizer on the #2 and in the item totalizer on the #1 line.

The next three items on the multiple item receipt (Fig. 17) are entered in exactly the same manner, as explained above, for the first two items thereon, and after all of the items have been entered and recorded, the operator initiates a Cash Total operation by depressing the Cash Total key 114 (Figs. 1 and 2) and during this operation the item totalizer is cleared and the amount "$26.01" therein is transferred to the group totalizer on the #1 line and recorded near the bottom of the receipt, and simultaneously, an identifying symbol "TL" is printed immediately to the right of the amount. Also during this Total Cash operation, which completes the multiple item transaction, the word "Thanks" is printed at the bottom of the receipt, along with the information which appears at the top of the succeeding receipt. The receipt material is then fed out the opening 138 near the upper righthand corner of the machine cabinet (Fig. 1), and in proper relation to a tearing blade located in said opening, so that said receipt may be torn off immediately below the word "Thanks."

It will be noted, by referring to Fig. 16, that only the amount of the total "$26.01" of multiple item transactions, the symbol "TL" and the consecutive number "954" are printed on the detail strip 140, and that the various items of a multiple-item transaction are not printed on said detail strip.

In single-item transactions, a receipt such as that shown in Fig. 18 is prepared, and in this case, the amount of the single item "$5.67" is set up on the amount keys 109 and the Single Item transaction key 113 depressed to initiate a single item operation, during which the amount of the single item is entered directly in the group totalizer on the #1 line and printed on the receipt. It will also be noted that the Single Item key 113 controls the positioning of the symbol type wheel to cause an identifying symbol "PD" to be printed immediately to the right of the amount of the item. As in the case of the multiple item receipt (Fig. 17), the word "Thanks" is printed near the bottom of the receipt at the same time the data appearing at the top of the succeeding receipt is printed on the receipt material. It will be noted that simultaneously with the printing of the amount "$5.67" of the single item on the receipt (Fig. 18), said amount is printed on the detail strip 140 and as also is the symbol "PD" and the consecutive number "955." Like the multiple item receipt, the single item receipt is fed past the tearing blade so that it may be severed immediately below the word "Thanks."

*Special counter mechanism*

As explained in the general description at the beginning of this application, the machine chosen to illustrate the present invention is provided with a plurality of step-to-step counters for keeping an accurate count of certain items represented by the control keys. These item counters include a Reset counter 125 (Figs. 1, 2 and 3) which counts one each time the total control lever 122 is moved either to Reset 1 or Reset 2 position, five counters 126 to 130 inclusive, corresponding to the "I" to "V" transaction or control keys 115 to 119 for the #2 totalizer line, a No-Sale counter 131, which counts one each time the Cash Total and No-Sale key 114 is used in no-sale transactions, a Paid-Out counter 132, which counts one each time the Paid-Out key 110 is used to initiate paid-out transactions, and a Customer counter 133, which counts one each time the Cash Total and No-Sale key 114 is used to initiate a cash total operation, and each time the Single Item key 113 is used to initiate a single item transaction, to keep an accurate count of the total number of customers.

The wheels of the special counters 125 to 133 inclusive (Figs. 1 and 3), are rotatably supported on a special counter reset shaft 361 journaled in the main frames 100 and 101, and supported near its center by a brace plate 362 secured to the machine base. It will be seen, by referring to Fig. 1, that the wheels of the special counters 125 to 133 inclusive, are visible through corresponding apertures in an off-set angular portion of the special counter cover plate 124, for the convenient viewing of said wheels through said apertures.

The shaft 361 has a linear groove therein (not shown) which engages reset pawls in each of the wheels of the special counters, with the exception of the Reset counter 125, and means, including a knob (not shown) is provided for turning the reset shaft 361 to reset said wheels to zero at the end of certain business periods or whenever desirable. The knob for revolving the reset shaft is accessible through the closure 134 (Fig. 1) and, therefore, only authorized persons with keys to said closure may reset the special counters. An interlocking mechanism is provided between the total control lever 122 (Figs. 1, 2 and 3) and the reset shaft 361, to prevent turning of said shaft except when said total control lever is in either Reset 1 or Reset 2 position.

The mechanism for the special counters 126 to 130 (Figs. 1, 2 and 3), for the second transaction row, and controlled by the #2 control keys 115 to 119 inclusive, is less complex in structure than the corresponding mechanism for the #1 transaction bank and will be described first.

The #2 transaction bank has a differential mechanism similar in every respect to the amount differential mechanism, explained earlier herein, said mechanism comprising a primary differential member (not shown) which is positioned under control of the #2 control keys 115 to 119, and which controls the positioning of a companion secondary differential member 159 (Fig. 23) which in turn controls the selection of the corresponding special counters 126 to 130. The secondary differential member 159 has pivotally connected thereto the upper end of a link 363, the other end of which is pivotally connected to a crank 364 secured on a shaft 365 journaled in the frames 100 and 362 (Fig. 3) and also in a left special counter frame 375 secured to the left frame 101 by means of various studs extending between said frames. Also secured on the shaft 365 (Fig. 23) is a series of stop arms 366 to 370 inclusive, which are arranged in helical fashion to correspond to the various positions of the secondary differential member 159 under control of the #2 control keys. The arms 366 to 370 cooperate with corresponding rollers 371 mounted on corresponding pitmans 372 for the five special counters 126 to 130 inclusive.

In Fig. 23, the pitman 372 for the special counter 130 corresponding to the "V" control key 119 is shown, and this will be used as representative of all five of the #2 special counters, as they operate alike, and are similar in construction.

The pitman 372 for the special counter 130, is pivotally connected at its upper end to a yoke 373, the parallel arms of which straddle the wheels of the corresponding special counter 130, said wheels each having integral therewith a feed ratchet 376 engaged by the graduated feeding teeth of a feed pawl 374 pivotally supported between the arms of the yoke 373 and urged clockwise by a spring (not shown) into yielding engagement with the teeth of said ratchets 376. Spring-pushed retaining pawls (not shown) coact with the teeth 376 to prevent retrograde movement of the wheels 130 during take-up movement of the feed pawl 374. The yoke 373 (Figs. 23 and 3) has an extension carrying a stud 583 engageable by either of two notches in a retaining pawl 584 free on a rod 585 supported by the main frames 100 and 101. A spring 586 urges the pawl 584 clockwise to retain said pawl in yielding engagement with the stud. The two notches in the pawl correspond to the take-up and fed positions of the yoke 373 and the pitman 372 and yieldingly retain said parts in either of these two positions. As previously explained, the special counters are of the increment or step-by-step type, which are advanced one digit each time they are operated, and amounts are transferred from lower to higher denomination wheels by means of the graduated or helically arranged teeth of the feed pawl 374, in cooperation with deep notches in the ratchets 376, said notches being located in relation to zero position.

The enlarged lower end of the pitman 372 (Fig. 23) has a control opening 377 with a shoulder 378, which cooperates with a rod 379 secured between an arm 380 and a cam lever 381 (see also Fig. 3) in turn free on a shaft 382 supported by the machine framework. The lever 381 carries rollers 383 and 384, which cooperate, respectively, with the edges of companion plate cams 385 and 386, secured on the main cam shaft 208, and performing one revolution of movement each machine operation, and functioning according to the time given in space 3 of the time chart (Fig. 31) to rock the rod 379 first down and then back to normal position, as here shown. A spring 389 (Fig. 23) urges the pitman 372 counterclockwise to normally maintain a rearward surface 387thereof in yielding contact with a pitman control rod 388 secured between two similar arms 390 (see also Fig. 3), free on a shaft 395, supported by the frames 100, 362 and 375. The righthand arm 390 (Fig. 23) carries a stud 391 engaged by a slot in an extension of a cam arm 392 free on the shaft 382 and carrying a roller 393 which cooperates with the periphery of a plate cam 394 secured on the main cam shaft 208. The cam 394 operates according to the time given in space 4 of the time chart (Fig. 31) to rock the rod 388 first rearwardly or counter-clockwise, and then back to normal position, as here shown.

When no control key 115 to 119 is depressed in row 2, the secondary differential member 159 (Fig. 23) is positioned as here shown, so that none of the arms 366 to 370 are in the path of the corresponding rollers 371 carried by the corresponding pitmans 372, and under this condition initial movement rearwardly of the rod 388 carries the lower end of the pitman 372 in unison therewith, under influence of the spring 389, to move a downward branch of the opening 377 opposite the rod 379. Consequently, upon operation of said rod 379, no up-and-down shifting movement will be imparted to the pitman 372, and as a result the corresponding special counter will not be actuated. Depressing the control key 119 for the "V" special counter 130 (Fig. 23) causes the corresponding arm 370 to be positioned opposite the roller 371, and therefore, rearward movement of the pitman 372, under influence of the rod 388, is obstructed, and the shoulder 378 remains in the path of the rod 379. Initial movement of the rod 379 shifts the pitman 372 downwardly to rock the yoke 373 clockwise, to cause the pawl 374 to advance the units wheels of the special counter 130 one digit to maintain an accurate count of the number of items entered in the corresponding set of totalizer wheels on the #2 totalizer line.

The #2 control keys 115 to 119 (Fig. 2) have been referred to as "Item Entering" keys; however, in the strictest sense this is inaccurate in the present adaptation, as said keys are used more in the capacity of department keys. For example, the "I" key 115 (Fig. 2) may be used for the meat department, the "II" key for the produce department, etc. When the #2 control keys are used in this manner, it is desirable that the corresponding special counters 126 to 130 (Fig. 3) operate to count one only once during the item-entering operations of a multiple-item transaction and after being thus operated, subsequent repeated use of the corresponding control key in the same transaction will not cause the corresponding special counter to be operated. In cases where it is desirable that the special counters operate each time the corresponding #2 control key is used, the opening 377 is restricted, as shown by the dot and dash line 587 (Fig. 23) whereupon the rod 379 operates the pitman 372 also in a take-up direction as well as in a feeding direction each machine operation.

Downward movement of the pitman 372 (Figs. 2, 23, 26, and 28) causes a forward extension 398 thereon to engage a bail 399, supported by arms 397, 400, 401, and 402, fast on the shaft 395, and carry said bail 399 downwardly in unison therewith.

The bail 399 is retained in either its upward or downward position by means of two notches in a rearward extension 403 of the arm 397 (Fig. 28) which cooperate with a stud 404 in the upper end of an arm 405 free on the shaft 382, and urged counter-clockwise by a spring 406 to yieldingly retain said stud 404 in engagement with said notches to locate and retain said restoring bail 399 in either of its two positions.

In single item transactions the bail 399 is restored upwardly, as will be explained presently, near the end of machine operation, and in multiple item transactions the bail 399 remains down until the last or Total Cash operation is performed, and said bail is then restored upwardly and carries in unison therewith any of the pitmans 372 which have previously been moved downwardly under influence of the rod 379 and the corresponding #2 control key to actuate the corresponding special counter. It should, therefore, be understood that in multiple item transactions each pitman 372 may be operated only once, as it remains in its down position, due to the clearance in the opening 377, and therefore, it should be obvious that regardless of how many times the same #2 control key 115 to 119 may be used in a multiple item transaction, the corresponding special counter 126 to 130 will be actuated only once, and that is the first time the corresponding #2 control key is used.

*Special counters for #1 transaction keys*

The row of #1 transaction keys 110 to 114 (Figs. 2 and 26) has a differential mechanism similar to that for the row of #2 transaction keys, and this differential mechanism comprises a primary differential member (not shown) positioned under control of the #1 transaction keys and the corresponding secondary member 158 which is then positioned under control of the primary member, in the manner explained before.

The secondary differential member 158 (Fig. 26) has pivotally connected thereto the upper end of a link 408, the lower end of which is pivotally connected to a crank 409 connected by a collar 411 (Figs. 3 and 24) free on the shaft 365, to a customer stop arm 410 and to a paid-out stop arm 412, to position said stop arms in relation to the depressed #1 control key. An arcuate surface 413 on the outer end of the arm 410 cooperates with a roller 407 carried by a pitman 414, the upper end of which is pivotally connected to a crank 415 free on the shaft 316. An enlarged downward portion of the pitman 414 (Fig. 26) has an L-shaped slot 416 engaged by a rod 417 secured between arms 418 and 419 (see also Fig. 3) free on the shaft 382. The arm 419 carries rollers 420 and 421 which cooperate, respectively, with the peripheries of companion plate cams 422 and 423 secured on the main cam shaft 208, and making one clockwise revolution each machine operation to control the up-and-down movement of the rod 417. The relationship of the slot 416 (Fig. 26) with respect to the rod 417 is controlled by a rod 425, an undercut portion of which is maintained in yielding contact with a rearward surface 424 of the pitman 414 by a spring 432 tensioned between said pitman and the shaft 382. The rod 425 is secured between arms 426 and 427 (Figs. 3 and 29) free on the shaft 395. The arm 427 carries a stud 428 engaged by a slot in a cam arm 429, free on the shaft 382, and carrying a roller 430, which cooperates with the periphery of a plate cam 431 secured on the main cam shaft 208, the spring 432 (Fig. 26) acting to retain said roller 430 in yielding contact with the periphery of said cam 431.

It will be recalled that it is compulsory to use one of the #2 transaction keys in connection with the Multiple Item key 112 (Fig. 2) or in connection with the Single Item key 113 (Fig. 2) and the use of said #2 control key causes the bail 399 (Figs. 3, 23 and 26) to be shifted downwardly, under influence of the corresponding pitman 372 for the depressed #2 key, in the manner explained above. In Single Item transactions, as in multiple-item transactions, this downward movement of the bail 399 occurs prior to operation of the rod 417, as will now be explained.

Using the Single Item key 113 to initiate a single item transaction, causes the corresponding portion of the surface 413 of the arm 410 (Fig. 26) to be positioned opposite the roller 407 to obstruct rearward movement of the pitman 414, when the rod 425 is moved rearwardly, according to the time given in space 1 of the time chart (Fig. 31) and as a result, movement of said pitman 414 in unison with said rod, under influence of the spring 432, is obstructed, and as a result said pitman 414 is retained in the position shown in Fig. 26, in which the horizontal branch of the slot 416 is in engagement with the rod 417. An upward extension of the arm 400 (Fig. 26) has a slot which engages a stud 433 in an arm 434 free on a shaft 435 supported by the frames 100 and 362 (Fig. 3). The arm 434 has a slot which engages a stud 436 in one arm of a yoke 437 (Fig. 27) free on the shaft 361, and supporting a feed pawl 438 which cooperates with the ratchets integral with each of the wheels of the customer counter 133 to advance said wheels, to keep an accurate count of the customers. Downward movement of the bail 399 and counterclockwise movement of the arm 400 under influence of the pitman 372 (Fig. 23) of the depressed #2 control key causes said arm 400 to rock the arm 434 clockwise, and said arm in turn rocks the yoke 437 counter-clockwise to impart retrograde or take-up movement to the feed pawl 438.

Operation of the rod 417 (Fig. 26) according to the time given in space 2 of the time chart (Fig. 31), shifts the pitman 414 upwardly, during which movement an extension 439 of said pitman engages a bushing on the bail 399 and restores said bail, the pitman 372, and the arm 400 upwardly or clockwise. Clockwise movement of the arm 400, through the intermediate arm 434, rocks the yoke 437 also clockwise causing the feed pawl 438 to advance the units wheel of the customer counter 133 one digit in single item transactions.

It will be recalled by referring to Figs. 1 and 2 that multiple item transactions consist of several item-entering operations, in which it is compulsory to use the #2 control keys 115 to 119 in conjunction with the Multiple Item key 112, and further consists of a Cash Total operation, in which the Cash Total key 114 is used in the final operation of a multiple item transaction to clear the item totalizer and to transfer the amount thereinto the group totalizer on the #1 line. In Cash Total operations the Cash Total key 114, through the #1 differential mechanism, shown in Fig. 26, positions the corresponding surface 413 of the arm 410 opposite the roller 407 to obstruct rearward movement of the pitman 414, upon operation of the rod 425. As a result, the rod 417 operates the pitman 414 in exactly the same manner as explained in connection with single item transactions to cause one to be entered in the customer counter 133.

In addition to operating the customer counter 133, the above-explained restoration of the bail 399 upwardly by the pitman 414 (Fig. 26) in Single-Item or One-Item Cash transactions, and in the Cash Total operation of a multiple-item transaction, causes said bail 399 to engage the extension 398 of any operated pitman 372, and restore said pitman upwardly to normal position. The pitmans 372 are retained in either of their two positions, normal or operated, by the corresponding pawl 584 (Fig. 23), and the bail 399 is retained in either of its two positions, upward or downward, by the arm 405 (Fig. 28), as explained before.

Depressing the Paid-Out key 110 (Figs. 1 and 2) through the #1 differential mechanism, positions the arm 412 (Figs. 24 and 26) as shown in dot and dash lines in Fig. 24, opposite a roller 440 carried by a paid-out pitman 441 pivotally connected at its upper end to a crank 442 free on the shaft 361. The pitman 441 carries a stud 443 engaged by a slot in a rearward extension of an arm 444, free on the shaft 435, and having a slot in a forward extension thereof, which engages a stud 445 (Fig. 25) in a yoke 446, the parallel arms of which straddle the wheels of the Paid-Out special counter 132, and freely engage the shaft 361 (see also Fig. 3). Pivotally mounted between the arms of the yoke 446 is a feed pawl 447 which cooperates with ratchets integral with each of the wheels of the Paid-Out counter 132, to advance said wheels one digit each Paid-Out operation. The enlarged lower end of the pitman 441 (Fig. 24) has an L-shaped slot 448 which cooperates with the rod 417, and a spring 449 urges said pitman 441 counterclockwise to normally maintain a rearward surface 450 thereof in yielding contact with an undercut portion of the rod 425.

In Paid-Out operations the arm 412 is positioned opposite the roller 440 (Fig. 24) and obstructs rearward movement of the pitman 441 upon initial movement rearwardly of the rod 425, and consequently, the horizontal branch of the slot 448 remains in engagement with the rod 417. Initial movement upwardly of the rod 417, according to the time given in space 2 (Fig. 31), shifts the pitman 441 upwardly to rock the arm 444 counterclockwise, which in turn rocks the yoke 446 clockwise, causing the feed pawl 447 to advance the units wheel of the Paid-Out counter 132 one digit to count the number of paid-out operations performed. Return movement downwardly of the rod 417 restores the pitman 441 downwardly to impart counter-clockwise pick-up movement to the yoke 446 (Figs. 24 and 25), and the feed pawl 447, in preparation for the next feeding movement thereof.

It will be recalled by referring to Figs. 1 and 2 that the Cash Total key 114 has a dual function in that when it is used in multiple item transactions it causes the item totalizer to be zeroized, and the amount therein transferred to the group totalizer. However, when the key 114 is used in other than multiple item transactions it functions as a No-Sale key, and in this case causes one to be entered in the no-sale special counter 131, and inasmuch as in this case there is nothing entered in the item totalizer, a no-sale operation is an idle operation as far as the item and group totalizers are concerned.

In no-sale operations it is impossible to depress an amount key 109 and it is impossible to use any of the #2 transaction keys 115 to 119 in conjunction with the Cash Total and No-Sale key 114, consequently none of the pitmans 372 (Fig. 23) is moved downwardly. In no-sale operations the control key 114 positions the arm 410 (Fig. 26) exactly as explained in connection with Cash Total operations, so that the surface 413 on said arm is opposite the roller 407 to render the pitman 414 active for up-and-down movement under influence of the rod 417. However, inasmuch as the bail 399 is not shifted downwardly by the pitmans 372 in no-sale operations, upward movement of said pitman 414 has no effect upon said bail, and consequently the customer counter 133 is not actuated.

An upward extension of the arm 401 (Figs. 3 and 28) which assists in supporting the bail 399, carries a stud 452, which cooperates with a cam slot 453 in an arm 454 free on the shaft 365, and secured in fixed relationship to a finger 455. A spring 456 urges the arm 454 and finger 455 clockwise to normally maintain the bottom of the slot 453 in yielding contact with the stud 452 when the bail 399 and the arm 401 are in their upward position, as here shown. This causes the stud 452, in cooperation with the slot 453 to position a stop surface 457 on the arm 454 opposite a roller 458 on a no-sale pitman 459, the upper end of which is pivotally connected to a crank 460 free on the shaft 361. The pitman 459 carries a stud 461, which engages a slot in an arm 462 (Fig. 3) similar to the arm 444 for the Paid-Out counter 132 (Fig. 24), said arm 462 being free on the shaft 435 and having a slot in its upper end which engages a stud in a no-sale yoke 463, the arms of which straddle the three wheels of the no-sale counter 131. The yoke 463 pivotally supports a feed pawl (not shown) similar to the feed pawl 447 for the paid-out counter, for actuating the wheels of the no-sale counter 131. The enlarged lower end of the pitman 459 (Fig. 28) has an L-shaped slot 464, which cooperates with the rod 417, and a spring 465 urges said pitman rearwardly or counter-clockwise to normally maintain a rearward surface 466 thereof in yielding contact with an undercut portion of the rod 425.

As previously explained, in no-sale operations, none of the #2 control keys 115 to 119 (Fig. 2) is depressed, and consequently the bail 399 and arm 401 (Fig. 28) remain in their upper position and the stud 452 retains the surface 457 of the stop arm 454 in the path of the roller 458 to prevent rearward movement of the pitman 459 and thus retain the horizontal branch of the slot 464 in engagement with the rod 417. Initial movement upwardly or clockwise of the rod 417 lifts the pitman 459 to advance the units wheel of the no-sale counter 131 one digit to count the number of no-sale operations performed. Return movement downwardly or counter-clockwise of the rod 417 restores the pitman 459 downwardly and revolves the feed yoke 463 (Fig. 3) of the no-sale special counter in a take-up direction in exactly the same manner as explained for the paid-out counter 132.

In transactions such as multiple item and single item, in which it is compulsory to use one of the #2 control keys 115 to 119 (Fig. 2), downward movement of the corresponding pitman 372 carries the bail 399 and the arm 401 in unison therewith causing the stud 452, in cooperation with the cam slot 453 to rock the stop arm 454 counter-clockwise against the action of the spring 456 to move said stop arm out of the path of the roller 458. This frees the pitman 459 for rearward or counter-clockwise movement under control of the rod 425, which moves the vertical branch of the slot 464 into alinement with the rod 417, whereupon movement of said rod will impart no movement of the no-sale pitman 459, and consequently the no-sale special counter will not be actuated.

In connection with the paid-out special counter mechanism shown in Figs. 24 and 25, it should be understood that in operations other than paid-out operations, the stop arm 412 is not positioned opposite the roller 440. Consequently the pitman 441 is free to move rearwardly or counter-clockwise under influence of the rod 425 and the spring 449, to aline the vertical portion of the slot 448 with the rod 417. In this case, up and down movement of the rod 417 will not be transmitted to the pitman 441, and consequently the paid-out counter will not be actuated. Likewise, in transactions in which the stop arm 410 for the customer counter 133 (Figs. 26 and 27) is not positioned opposite the roller 407, the corresponding pitman 414 is free to move rearwardly under control of the rod 425 and the spring 432, to aline the vertical portion of the slot 416 with the rod 417, whereupon up-and-down movement of said rod will not be imparted to said pitman 414 and consequently the customer counter will not be actuated.

By referring to Fig. 20, and the description in connection therewith, it will be remembered that the Paid-Out key 110, because of the control plate 323, cannot be used in conjunction with any of the #2 control keys 115 to 119 (Fig. 2) in paid-out transactions. In this case the bail 399 and arm 401 (Figs. 26 and 28) remain in their upper position and retain the stop arm 454 in position to prevent rearward movement of the pitman 459, which would normally cause operation of the no-sale special counter 131. To prevent this undesirable condition, mechanism under control of the paid-out key moves the stop arm 454 counter-clockwise out of the path of the roller 458.

Movement of the paid-out stop arm 412 (Figs. 24, 28 and 30) into effective position to block rearward movement of the pitman 441 causes a stud 467 carried thereby to engage an arm 468 of a yoke 469 free on the shaft 395, and rock said yoke counter-clockwise. Counter-clockwise movement of the yoke 469 causes a stud 470, secured in the upper end of the other arm of said yoke, to engage the finger 445 and rock said finger and the stop arm 454 counter-clockwise, against the action of the spring 456, out of the path of the roller 458, to render the operating mechanism for the no-sale special counter 131 inoperative during paid-out transactions. When the stop arm 454 (Fig. 28) is thus rocked counter-clockwise under control of the paid-out key, a clearance portion of the cam slot 453 prevents the stud 452 in the arm 401 from interfering with such movement.

MODIFIED FORM

Many customers of large grocery chain stores or super markets do their basic shopping weekly, and generally this shopping involves the purchase of many and varied items, some of which are taxable and some of which are not taxable. These taxable items and non-taxable items are mixed indiscriminately during shopping and the computation of the tax on the taxable items present quite a problem for the cashier when the purchases are checked out, as most of these stores utilize what is known as the "check-out system" for determining the value of the purchased items.

Generally the machine used in connection with most of the check-out systems has only one itemizer or item totalizer for listing the purchased items, as they are checked out, and to properly handle taxable items with such a system requires that such items be separated or pre-sorted from the non-taxable items and listed first.

After all taxable items have been listed, a sub-total or reading operation is performed to obtain the total amount of said items, and the recording or indication of this sub-total is used for computing the tax, which may be done mentally or by use of a chart, and afterward the amount of the tax is entered in the machine. The pre-sorting of taxable items requires considerable time and slows up the movement of customers through the check-out line, and presents quite a serious problem during rush periods.

The modified form of this application discloses a dual-listing mechanism which remedies the above undesirable condition, and this mechanism comprises two item totalizers, one for the entering of taxable items and one for the entering of non-taxable items. This permits the use of a check-out system in which the taxable and non-taxable items may be listed indiscriminately, and thus eliminates the preliminary sorting of taxable items prior to the listing operation. In this simplified and efficient dual-listing system, it is required only that taxable items be entered in the tax or auxiliary item totalizer and that non-taxable items be entered in the non-tax or main item totalizer in the order in which these items are encountered during the checking-out process. After all of the various items have been listed, an enforced Tax Total operation is performed to clear the auxiliary item totalizer and add the amount therein in the main item totalizer. During the clearing of the auxiliary item totalizer the amount therein is displayed on the indicators 137 (Fig. 1) and is used by the operator for computing the tax on said items, which tax is then set up on the amount keys, and in a tax operation is entered in the main item totalizer and in the tax totalizer on the #2 totalizer line. Finally, a cash total operation is performed to clear the main item totalizer, and simultaneously add said total amount in the group totalizer on the #1 line and indicate and record the said total amount.

The machine of the modified form is similar in every respect to the preferred form, with the exception that the #1 totalizer line is provided with four sets of totalizer wheels, two sets of which are item totalizers, the third set being a group totalizer, which accumulates a total of the amounts cleared from the main item totalizer, and the fourth set being a paid-out totalizer for accumulating totals of paid-out items. The main item totalizer is used exactly like the item totalizer in the preferred form for temporarily accumulating totals of items in multiple item transactions, and in the present adaptation the auxiliary item totalizer is used for the accumulation of the amounts of taxable items.

Obviously, the use of the auxiliary item totalizer for the accumulation of taxable items is only one use for such a totalizer and is used here merely as an example and is not to be implied as a limitation, as there are many other ways in which two item totalizers may be used to advantage in the keeping of separate totals of any desired items.

As explained above, with the exception of the two item totalizers on the #1 line, the machine of the modified form is similar in every respect to that of the preferred form. However the controlling mechanism for the two item totalizers is more or less specific to the modified form of mechanism and will be described in detail hereinafter.

The only material difference between the keyboard of the preferred form and that of the modified form is in the control keys for the #1 and #2 totalizer lines. The control keys for the modified form are shown in Fig. 32, and comprise for the #1 totalizer line, a Paid-Out key 473, Sub-Total key 474, Grocery key 475, Taxable Total key 476, and a combined Cash Total and No-Sale key 477. The control keys for the #2 totalizer line comprise a Meat key 478, Produce key 479, Taxable Grocery key 480, Special key 481 and Tax key 482.

The first row of transaction keys 473 to 477 (Fig. 32) control the shifting of the #1 totalizer line, to aline the corresponding set of totalizer wheels with the primary differential members in exactly the same manner as explained in connection with the corresponding keys for the preferred form. The control keys 473 to 477 have studs 483 in their stems (Figs. 32 and 37), which cooperate with corresponding camming surfaces formed in the mutilated periphery of a #1 shifting segment 485, which is similar to and takes the place of the corresponding #1 shifting segment 164 (Fig. 12) for the preferred form. The segment 485 has a rearward extension with a slot which engages the stud 165 in the arm 166 to shift the sleeve 161 (Figs. 4 and 41) along the #1 totalizer line 153, to aline the selected set of wheels 152 with the amount actuators. Normally the wheels of the auxiliary item totalizer are in alinement with the primary differential members.

Depressing the Paid-Out key 473 causes the stud 483, in cooperation with the corresponding camming surface on the segment 485, to shift the #1 totalizer line three steps to aline the fourth set of wheels (Fig. 41) comprising the paid-out totalizer, with the primary differential members for actuation thereby. The Grocery key 475 (Figs. 32 and 37) rocks the segment 485 clockwise to aline the second set of wheels on the #1 totalizer line with the primary differential members for actuation thereby. The second set of wheels on the #1 totalizer line comprise the main item totalizer, in which a total of all items is temporarily accumulated. The Sub-Total key 474 and the Cash Total key 477 also rock the segment 485 a proper extent clockwise to aline the wheels of the main item totalizer with the primary differential members for actuation thereby in reading and resetting time, respectively. The stud 483 in the stem of the Taxable Total key 476 (Fig. 37) imparts no shifting movement to the segment 485, and consequently the wheels of the auxiliary item totalizer remain in alinement with the primary differential members for actuation thereby.

It should, therefore, be evident from the foregoing description that in the modified form depressing the #1 control keys 473 to 477 through the segment 485, shift the corresponding set of totalizer wheels on the #1 line into alinement with the primary differential members for actuation thereby.

In addition to the manual shifting of the #1 totalizer line, as in the preferred form, automatic means is provided for shifting said line to transfer totals from the auxiliary item totalizer to the main item totalizer and from the main item totalizer to the group totalizer, in taxable total and cash total operations, respectively.

It will be noted that the slot in the segment 485 (Fig. 37) for the stud 483 for the Taxable Total key 476 is enlarged at the bottom to permit the shifting of said segment 485 under influence of the mechanism shown in Fig. 36. The studs 483 in the stems of the keys 473 to 477 (Figs. 32 and 36) also coact with corresponding slots in the mutilated periphery of a segment 486 free on the shaft 147 and connected by a link 487 to a shifting arm 488. The upper end of the arm 488 has an opening 489 with control surfaces, which cooperate with a stud 490 in a shifting segment 491. The parts 486 to 491 are similar to and function exactly like the corresponding parts 176 to 180 inclusive, of the preferred form shown in Fig. 12, for imparting automatic shifting movement to the #1 totalizer line in transfer-total operations.

The stud 483 in the Taxable Total key 476 coacts with a slot in the segment 486, which imparts no movement to said segment, and consequently it and the arm 488 remain in the position here shown, in which the operating stud 490 is opposite and coacts with a control surface 492 in the opening 489. As previously explained, depression of the Taxable Total key 476, through the segment 485 (Fig. 37) alines the wheels of the auxiliary item totalizer with the primary differential members and during the first part of machine operation said wheels are reset to zero to position the primary differential members accordingly. After being reset the auxiliary item totalizer wheels are disengaged from the primary differential members, and operation of the shifting segment 491 (Fig. 36) follows immediately to cause the stud 490 to engage the surface 492 and shift the arm 488 downwardly. This, through the mechanism shown in Fig. 12 and explained earlier herein, imparts one step of shifting movement to the #1 totalizer line to aline the wheels of the main item totalizer with the primary differential members, prior to their return movement. The wheels of the main item totalizer are then engaged with the primary differential members prior to their return movement, which movement rotates said wheels in accordance with the amount cleared from the auxiliary item totalizer to enter said amount therein. Return movement clockwise of the segment 491, near the end of machine operation, causes the stud 490 to engage the upper surface of the opening 489 to shift the arm 488 upwardly to its normal position, as shown in Fig. 36, in which position the wheels of the auxiliary item totalizer are again in alinement with the primary differential members.

The stud 483 (Figs. 32 and 37) in the Cash Total key 477, cooperating with the corresponding slot in the segment 485, shifts said segment one step in a clockwise direction to aline the wheels of the main item totalizer with the primary differential members. It will be noted that the slot in the segment 485 for the key 477 has sufficient clearance in the bottom portion thereof for the stud 483, to permit shifting of said segment one additional step in a clockwise direction. The stud 483 (Fig. 36) for the Cash Total key 477, coacting with the corresponding slot in the segment 486, shifts said segment and the arm 488 clockwise to move a control surface 494 in the opening 489 in the path of the stud 490. In the beginning of Cash Total operations the wheels of the main item totalizer are engaged with the primary differential members prior to their initial movement, which movement rotates said wheels in a reverse direction to zero, to position said primary differential members accordingly. After the wheels of the main item totalizer have been zeroized, they are disengaged from the primary differential members, and immediately thereafter initial movement counter-clockwise of the segment 491 (Fig. 36) causes the stud 490 to engage the surface 494 and shift the arm 488 downwardly to aline the wheels of the #3 or group totalizer (Fig. 41) with the primary differential members prior to their return movement. The wheels of the group totalizer are engaged with the primary differential members prior to their return movement, which movement rotates said wheels in an additive direction to enter therein the amount cleared from the main item totalizer. The stud 484 in the Taxable Grocery key 480 (Fig. 36) upon depression of said key, coacts with a corresponding camming slot in the segment 486 to shift said segment and the arm 488 clockwise to aline a low control surface 495 in the opening 489 with the stud 490. Subsequent operation of the segment 491 and stud 490, imparts no downward shifting movement to the arm 488, and consequently, the wheels of the auxiliary item totalizer remain in alinement with the primary differential members.

The stud 483 in the Paid-Out key 473, coacting with the corresponding camming slot, shifts the segment 486 (Fig. 36) and the arm 488 clockwise to move the control surface 494 beneath the stud 490. However, this is of no importance in this case as there is no transferring of totals in paid-out operations, and the stud 483 in the Paid-Out key (Fig. 37) coacting with the segment 485, controls the shifting of the #1 totalizer line to aline the #4 or paid-out totalizer wheels (Fig. 41) with the primary differential members, in the manner explained before.

The stud 480 in the stem of the Taxable Grocery key 484 (Figs. 32 and 36) shifts the segment and the arm 488 clockwise to aline the surface 495 with the stud 490, so that operation of said stud will impart no movement to the arm 488, and consequently the wheels of the #1 or auxiliary item totalizer will remain in alinement with the primary differential members throughout machine operation to accumulate a temporary total of taxable items.

It will be recalled that the Sub-Total key 474 and the Grocery key 475 (Fig. 32) both impart a similar extent of movement to segment 485 (Fig. 37) to aline the wheels of the #2 or main item totalizer with the primary differential members, and it will be realized by referring to Fig. 36 that these studs impart no movement to the segment 486 and arm 488, and consequently the surface 492 remains in the path of the stud 490 to insure that the wheels of the main item totalizer are in alinement with the primary differential members.

It will be noted by referring to Fig. 34, that each of the #2 control keys 478 to 482 inclusive has in the stem thereof one of the studs 484, which coacts with the corresponding camming slots or notches in a #2 selecting plate 496 rockably supported by parallel arms in turn pivoted on studs secured in the #2 key frame, in exactly the same manner as the selecting plate 256 for the preferred form, shown in Fig. 11. The plate 496 carries a stud 497 which engages a slot in the outer end of the lever 253, which through the mechanism shown in Figs. 4 and 11, controls the shifting of the #2 totalizer line to selectively aline the five sets of totalizer wheels corresponding to the #2 control keys with the primary differential members, in the manner explained before.

Beginning with the lowermost #2 control key 482, and continuing upward, these keys select, respectively, the number one to five sets of totalizer wheels on the #2 line. From this it is evident that the Taxable Grocery key 480 selects the #3 totalizer on the #2 line, as also does the Grocery key 475 in the first row, which, by means of the stud 483 (Fig. 34) therein, in cooperation with a cam slot 498 in a plate 499 secured to the selecting plate 496, positions said plate exactly the same as the stud 484 in the Taxable Grocery key 480, to select the #3 totalizer on the #2 line for actuation. It should, therefore, be realized that the amounts of both taxable and non-taxable groceries are entered in the #3 totalizer on the #2 line, while they are being entered in their respective item totalizers on the #1 line.

The studs 483 and 484 in the #1 and #2 control keys (Figs. 32 and 33) cooperate, respectively, with corresponding camming slots in the mutilated periphery of a totalizer engaging control segment 500 free on the shaft 147, said segment 500 being similar to and functioning exactly like the corresponding segment 213 (Figs. 7 and 9) for the preferred form, for controlling the engaging and disengaging movement of the selected totalizers on the #1 and #2 lines with and from the primary differential members. A rearward extension of the segment 500 carries a stud 501 which engages the slots in the upper ends of the engaging links 211 and 302 (see also Figs. 7 to 10) for controlling the positioning of the corresponding engaging pitmans in relation to their respective operating studs, in the manner explained previously.

Depressing the Sub-Total key 474 (Figs. 32 and 33) causes the stud 483 therein, in cooperation with the camming slot in the segment 500, to shift said segment one step in a counter-clockwise direction which, through the link 211 (Figs. 7 and 8) lifts the engaging pitmans 192 and 193 for the #1 totalizer line one step from register position to read position, in exactly the same manner as explained before. Inasmuch as the Sub-Total key, through the mechanism shown in Fig. 37 and explained before, selects the main item totalizer on the #1 totalizer line for a reading operation, the engaging mechanism shown in Figs. 7 and 8 will cause said totalizer to be engaged and disengaged with and from the primary differential members in read timing.

The Taxable Total key 476 and the Cash Total key 477 each initiates a transfer total operation, and in this case the segment 500 (Fig. 33) is shifted one step counter-clockwise, exactly the same as in sub-total operations, which is necessary for the proper engaging and disengaging of the selected totalizers in transfer total operations. The Taxable Total key 476, it will be recalled, through the mechanism shown in Figs. 36 and 37, first selects the auxiliary item totalizer for clearing during the first part of the taxable total operation and during the latter part of said taxable total operation the main item totalizer will be automatically selected for addition, to cause the taxable total to be transferred from the auxiliary item totalizer to the main totalizer, at the same time it is being indicated and recorded. In a like manner the Cash Total key 477, through the mechanism shown in Figs. 36 and 37, and explained before, causes the main item totalizer to be selected for a clearing operation in the first part of the Cash Total operation, and the mechanism shown in Fig. 36 causes the #3 or group totalizer on the #1 line to be automatically selected for addition during the latter part of said operation to transfer the total of the multiple item transaction from the main item totalizer to the group totalizer, and to simultaneously indicate and record the result of this transaction.

From the foregoing explanation it should be clear that in transfer-total operations the engaging mechanism functions during sub-total timing, and during the first part of said operation one of the totalizers is zeroized to position the primary differential members accordingly, after which said first totalizer is disengaged from the primary differential members, and the mechanism shown in Fig. 36 then imparts shifting movement to the #1 totalizer line to aline the second set of totalizer wheels with the primary differential members. Immediately thereafter the second set of wheels are engaged with the primary differential members prior to their return movement, which under ordinary circumstances would reenter the amount temporarily cleared from the first totalizer back in said first totalizer, but in this case the amount is entered in the second totalizer, to effect a transfer total operation in a single cycle of machine operation.

Counter-clockwise movement of the segment 500 (Fig. 33) upon depression of any one of the keys 474, 476 or 477, moves obstructing surfaces on the periphery of said segment into the path of the studs 484 for the #2 control keys to prevent depression of any of said keys in conjunction with the three keys named above. Likewise, depression of any one of the #2 control keys moves the stud 484 therein into the path of a corresponding obstructing surface on the segment 500 to block counter-clockwise movement of said segment 500, and thus prevents depression of any one of said three keys 474, 476 or 477. It will be noted that the Paid-Out key 473 and the Grocery key 475 in the first transaction row, upon being depressed, likewise obstruct counter-clockwise movement of the segment 500, and it should, therefore, be evident that when either of these keys or any one of the #2 control keys 478 to 482 is depressed, the pitmans 192 and 193 (Figs. 7 and 8) for the #1 totalizer line, will remain in register position, as here shown, to cause the selected set of wheels on the #1 totalizer line to be engaged and disengaged in add timing. When no counter-clockwise movement is imparted to the segment 500 (Fig. 33), as explained above, the pitmans 284 and 285 for the #2 totalizer line (Figs. 9 and 10) are retained in register position, as here shown, and consequently, the selected set of wheels on the #2 totalizer line will be engaged and disengaged with and from the primary differential members in add timing. In a like manner, counter-clockwise movement of the segment 500, upon depression of either of the keys 474, 476, or 477, as explained above, through the link 302, shifts the pitmans 284 and 285 (Figs. 9 and 10) upwardly one step from register position to locked register position, so that no engaging or disengaging movement will be imparted to the #2 totalizer line.

In the modified form, all of the control keys in row 1 (Fig. 32), and all of the control keys in row 2 are motorized keys, and depression of any one of these keys immediately initiates machine operation. Therefore, it is impossible that the keys of rows 1 and 2 be used in conjunction with each other, and proper interlocking mechanism is provided between the two rows of control keys to insure that when a key in one row is depressed, no key in the other row may be either simultaneously depressed or depressed afterward, until the machine operation has been completed.

Moving the total control lever 122 (Fig. 2) to Read 1 or Reset 1 position, through the mechanism shown in Figs. 7 and 8, and explained earlier herein, causes the pitmans 192 and 193 to be positioned accordingly, to cause the selected set of totalizer wheels on the #1 totalizer line to be either read or reset.

A locking plate 502 (Fig. 38) corresponding to and operating similarly to the plate 318 (Fig. 19) of the preferred form, is provided for the #1 row of control keys 473 to 477 (Fig. 32) for controlling the depression of said keys, in relation to the position of the total control lever 122 (Fig. 2). The locking plate 502 has a slot which engages the stud 319 in the arm 320 (Figs. 19 and 38), which arm is operatively connected to the total control lever 122 in the manner explained above, so that movement of said total control lever positions said plate 502 in accordance therewith. The total control lever and the locking plate 502 are normally in Register position as shown here.

Moving the total control lever to Locked Register position moves the locking plate 502 one step in a clockwise direction to move obstructing surfaces on the periphery thereof into the path of the studs 483 in the #1 control keys 473 to 477 inclusive, to obstruct depression of said control keys. Moving the total control lever 122 to either Read 2 or Reset 2 position moves the plate 502 two or three steps, respectively, in a clockwise direction to move obstructing surfaces of the periphery thereof into the path of the studs 483 for all of the #1 control keys with the exception of the Grocery key 475. This is because the Grocery key is used in this case to select the #3 totalizer on the #2 totalizer line for reading and resetting functions, as explained previously in connection with Fig. 34. Moving the total control lever 122 to Read 1 or Reset 1 position moves the locking plate 502 one or two steps, respectively, in a counter-clockwise direction to move obstructing surfaces on the periphery thereof into the path of the studs 483 for the Sub-Total key 474, the Grocery key 475, and the Tax Total key 476, to obstruct depression of said keys when said total control lever is in either Read 1 or Reset 1 position. When the total control lever is in Read 1 or Reset 1 position, the studs 483 for the Paid-Out key 473 and the Cash Total key 477 are unobstructed and, consequently, these keys may be used to select the corresponding totalizers on the #1 totalizer line for read and reset operations. It should be remembered that throughout this specification the terms read and reset and subtotal and total have been used interchangeably and refer to the same types of operations.

The locking plate 502 (Fig. 38) has a cam slot 503, through which extends a stud 504 secured in the free end of a link 505, the other end of which is pivotally supported by a stud 506 in a forward extension of a hook-shaped arm 507 free on the shaft 147. A spring 508, tensioned between a stud in an extension of the arm 507 and a stationary stop stud 509, urges said arm 507, the link 505, and the stud 504, counter-clockwise to normally maintain the outer end of said extension in contact with said stop stud 509. The stud 504 also extends through locking slots 510 and 511 (Figs. 36 and 37) in the segments 485 and 486, whereupon movement of the total control lever 122 to either Read 1 or Reset 1 position causes the cam slot 503 to shift said stud 504 downwardly into engagement with the locking portions of the slots 510 and 511 to lock the segments 485 and 486 together for unitary movement. This locking of the segments 485 and 486 together permits the stud 483 in the Cash Total key 477, in cooperation with a camming surface 512 on said segment 486, to shift both of the segments the same extent to aline the #3 or group totalizer wheels of the #1 totalizer line with the primary differential members in cash total reading and resetting operations. This locking of the segments 485 and 486 together is necessary in Read 1 and Reset 1 operations to nullify the operation of the transfer total mechanism and thereby prevent the selection of the main item totalizer under control of the stud 483, in cooperation with the corresponding camming slot in the segment 485, as explained in connection with transfer total operations.

*Taxable total indicator*

An indicator 515 (Figs. 32 and 40) is visible through an opening 516 in a cover plate 517 for the transaction keys, and is operated by the Taxable Grocery key 480 to remind the operator that, in this instance, a taxable total operation, under control of the Taxable Total key 476 must be performed prior to a cash total operation under control of the Cash Total key 477. The indicator 515 (Fig. 40) is secured to an extension 518 of a slide 519 shiftably mounted on a control bar 520 by means of studs 521 therein, in cooperation with corresponding slots in said bar. A spring 522 urges the slide 519 counter-clockwise or downwardly, to normally maintain the studs 521 in yielding contact with the downward ends of the slots in the bar 520. The bar 520 is rockably mounted in the transaction key frame by means of parallel arms 523, in cooperation with the studs 259. The bar 520 has five angular projections 524, which cooperate with the studs 483 and 484 in the control keys 473 to 482 inclusive, to prevent the simultaneous depression of the #1 and #2 control keys.

For example, depressing the Paid-Out key 473 (Figs. 32 and 40) causes the stud 483 therein, in cooperation with the corresponding projection 524, to rock the bar 520 downwardly or counter-clockwise to move the projections 524 into the path of the studs 484 for the #2 transaction or control keys, to obstruct depression of these keys. Likewise, depressing the Meat key 487 causes the stud 484 therein to move into the path of the corresponding projection 524 to obstruct counter-clockwise movement of the bar 520 and thus retain the projections 524 in the path of the studs 483 in the #1 control keys to obstruct depression of these keys, when a key is depressed in row 2.

Depressing the Taxable Grocery key 480 (Fig. 40) causes the stud 484 therein, in cooperation with a camming projection 525 (Fig. 40) on the slide 519, to shift said slide clockwise or upwardly, against the action of the spring 522, to move the indicator 515 opposite the opening 516 to remind the operator that a taxable total operation must be performed. Clockwise movement of the slide 519 (Fig. 40) moves a notch 526 in the lower edge thereof opposite a tooth of a retaining pawl 527 free on a stud 528 carried by a bar 529 secured to the framework for the control keys, whereupon a torsion spring 530 urges said pawl counter-clockwise to engage its tooth with the notch 526 to retain the slide 519 in its upward position after the Taxable Grocery key 480 has been released, and until a taxable total operation is performed. Upward shifting movement of the slide 519, upon depression of the Taxable Grocery key 480, moves projections 531 and 532 thereon beneath the studs 483 in the Sub-Total key 474 and the Cash Total key 477 to obstruct depression of these keys, until the pawl 527 is disengaged from the notch 526 during a subsequent taxable total operation, under control of the key 476.

The pawl 527 (Fig. 40) has an extending finger 533, which cooperates with a stud 534 (Fig. 33) in an arm 535 shiftably mounted on the segment 500 by means of a slot in the lower end of said arm, which freely engages a hub of said segment, and by means of an angular slot 536 near the upper end of said arm, which engages a stud 541 in said segment 500. A spring 537 urges the arm 535 upwardly, to normal position, in which a flat portion of a stud 538 mounted in a downward extension of said arm 535, is above and out of the path of an operating extension 539 on a clutch pinion supporting arm 540 for the second transaction or control bank.

Depression of the Taxable Total key 476 to initiate a taxable total operation, causes the stud 483 therein, in cooperation with the corresponding camming surface in the segment 500, to rock said segment downwardly or counter-clockwise. Counter-clockwise movement of the segment 500 causes the stud 541 therein, in cooperation with the angular slot 536 to carry the arm 535 counter-clockwise in unison therewith to move the stud 538 into the path of the operating extension 539. Clockwise disengaging movement of the clutch pinion arm 540, at the beginning of a taxable total operation, causes the extension 539, in cooperation with the stud 538, to shift the arm 535 downwardly and counter-clockwise, under control of the spring 537 and the angular slot 536, to cause the stud 534 to engage the finger 535 and rock the pawl 527 (Fig. 40) clockwise, against the action of the spring 530, to disengage the tooth of said pawl from the notch 526. This frees the slide 519 to the action of the spring 522, which immediately restores said slide downward to normal position, as shown here, in which position the indicator 515 is not visible through the opening 516. This restoring movement of the slide 515 also moves the projections 531 and 532 thereon out of the path of the studs in the Sub-Total and Cash Total keys to free said keys for subsequent depression, to initiate sub-total or cash total operations.

OPERATION OF MODIFIED FORM

The receipt shown in Fig. 35 is the result of a multiple item transaction, which comprises several item-entering operations and a final cash total operation, said item-entering operations including the entering of taxable and non-taxable items, and an enforced taxable total operation to ascertain the total amount of the taxable groceries so that the tax, in connection therewith, may be computed and entered in the tax totalizer. The data at the top of the receipt shown in Fig. 35, including the statement "Dual Itemizer," the consecutive number "014" and the date "–6 Feb. 54," are printed at the end of the preceding operation, and forms the heading for the receipt to be issued in the next succeeding operation.

First the operator makes sure that the total control lever 122 (Figs. 1 and 2) is in Register position, then depresses the proper clerks' key 120 (in this case "A") and sets up the amount of the first item "$1.25" on the amount keys 109. Inasmuch as the first item is a non-taxable grocery item, the Grocery key 475 (Fig. 32) is depressed to initiate machine operation, and during this operation this key causes the amount to be added in the main item totalizer on the #1 line and in the #3 or grocery totalizer on the #2 line. Also during this machine operation, the amount of the item, the clerks' initial, and a symbol of the type of operation, "Groc." are printed on the first line of the receipt (Fig. 35), after which said receipt is line-spaced in preparation for the printing of the second item.

Next the amount of the second item, "$3.00," is set up on the amount keys, and as this is for the purchase of produce, the Produce key 479 in the second control row is depressed to initiate machine operation. During machine operation the amount of the produce item, the clerk's initial, and a symbol of the operation "Prod." are printed on the second line of the receipt, after which said receipt is line-spaced in preparation for the third item. The depression of the Produce key 479 also selects the main item totalizer on the #1 line, and the fourth or produce totalizer on the #2 line, and during machine operations the amount of the produce items is added in these two totalizers.

Next, the amount of the third item "$4.00" is set up on the amount keys, and as this is for the purchase of meat, the Meat key 478 in row 2 is depressed to initiate machine operation, during which operation the amount of the meat item is added in the main item totalizer on the #1 line, and in the meat or #5 totalizer on the #2 line. Also, during machine operation the amount of the meat item, the clerk's initial, and an identifying symbol, "Meat," are printed on the third line of the receipt (Fig. 35) after which said receipt is line-spaced in preparation for the fourth item.

The amount of the fourth item "$2.50," is set up on the amount keys, and inasmuch as this is a taxable grocery item, the Taxable Grocery key 480 in the second transaction row (Fig. 32) is depressed to initiate machine operation. The Taxable Grocery key selects the auxiliary item totalizer on the #1 line, and the grocery or #3 totalizer on the #2 line for addition, and during machine operation the amount of the taxable item is added in these two totalizers. Also during machine operation the amount of the taxable grocery item, the clerk's initial, and a symbol "Tax. Groc." are printed on the fourth line of the receipt (Fig. 35), after which said receipt is line-spaced in preparation for the fifth item.

The amount of the fifth item, "$1.40," is set up on the amount keys, and inasmuch as this is a special item, the Special key 481 in the second transaction row is depressed to initiate machine operation. The special key 481 selects the main item totalizer on the #1 line, and the special or #2 totalizer on the #2 line for addition, and during machine operation the amount of the special item is added in these totalizers. Also, during machine operation the amount of the special item, the clerk's initial, and a symbol to identify the operation, "Spec.," are printed on the fifth line of the receipt (Fig. 35) after which said receipt is line-spaced in preparation for the next item.

Inasmuch as there are no more items to be entered in this multiple item transaction, the operator depresses the Taxable Total key 476 to initiate a taxable total operation during which the auxiliary item totalizer is cleared, and in a transfer total operation, as explained in connection with Figs. 36 and 37, the amount of the taxable total is added in the main item totalizer during the latter part of the taxable total operation. It will be noted by referring to Fig. 35 that the amount of the taxable total is not printed upon the receipt, but is set up on the amount indicators only, and as these indicators remain in set position at the end of the taxable total operation the operator may ascertain from them the amount of the tax on the taxable total, which in this case is ".08." The amount of the tax ".08," is then set up on the amount keys, after which the Tax key 482, in row 2, is depressed to initiate a tax operation, during which the amount of the tax is added in the main item totalizer on the #1 line, and in the #1 or tax totalizer on the #2 line. Also, during the tax operation the amount of the tax, the clerk's initial, and a symbol, "Tax," are printed on the sixth line of the receipt (Fig. 35), after which said receipt is double-line spaced in preparation for the final operation.

It will be recalled that depressing the Taxable Total key 476 unlocks the Cash Total key 477, and the operator depresses this key to initiate the final operation "Cash Total" of a multiple item transaction. By referring to Figs. 36 and 37, it will be recalled that depression of the Cash Total key 477 initiates a transfer total operation, during which the main item totalizer, which contains a total of all the items entered on the receipt (Fig. 35) is cleared, and the amount therein is transferred to the group or #3 totalizer on the #1 line. Also, during the cash total operation, the amount of the cash total, "$12.23," the clerk's initial, and a symbol of the operation, "Totl.," are printed on the seventh line of the receipt. Also during the total cash operation the "Presorting Eliminated," is printed near the bottom edge of the receipt, after which said receipt is fed outwardly, the proper extent in relation to the tearing blade, located in the opening 138 (Fig. 1) in the cabinet 105, so that said receipt may be severed from the web of the receipt material.

The Sub-Total key 474 (Fig. 32) may be used to initiate a sub-total operation to read the amount in the main item totalizer at any time, except during the interim between the entry of a taxable grocery item and the taking of a taxable total, during which interim said Sub-Total key is locked against depression, as explained in connection with Fig. 40.

Like the preferred form, the modified form of machine is provided with a detail strip similar to that shown in Fig. 16, upon which all of the data except the date and the information at the extreme upper and lower edges of the receipt (Fig. 35) is printed, to provide a record of all operations for use by the proprietor or other person in charge.

While the forms of mechanisms herein shown and described are admirably adapted to fulfill the objects primarily stated, it is to be understood that it is not intended to confine the invention to the forms or embodiments herein disclosed, for it is susceptible of embodiment in various other forms, all coming within the scope and spirit of the invention.

What is claimed is:

1. In a machine of the class described, capable of item-entering operations, the combination of a plurality of operable item-entering control elements; a step-by-step counter for each control element to count the times each element is operated; means including a movable pitman operatively connected to each counter; means to move the pitmans from a normal position to an operated position to actuate the corresponding counter; means to yieldingly retain the pitmans in either normal or operated position; means to move the pitmans out of coacting relationship with the first moving means; a differential mechanism positioned by the operated control element; means controlled by the differential mechanism to selectively retain the pitman corresponding to the operated control element in coacting relationship with the first moving means to count "one" in the counter corresponding to said operated control element; and means to restore the operated pitman to normal position.

2. In a machine of the class described, capable of performing transactions comprising several related operations, the combination of a plurality of operable control elements; a positionable differential mechanism positionable by the operated control element; a plurality of increment or step-by-step counters corresponding to the different control elements; means including a movable pitman associated with each counter for actuating said counters; means to move the pitmans from a normal position to an operated position to actuate the counters, said pitmans normally in coacting relationship with said moving means; means effective each machine operation to move the pitmans out of coacting relationship with the first moving means; means controlled by the differential mechanism to selectively retain the pitman corresponding to the operated control element in coacting relationship with the first moving means to cause said pitman to be moved from normal to operated position to count "one" in the corresponding counter; means to yieldingly retain the operated pitman in operated position; and means effective in the final operation of said related machine operations to restore all operated pitmans to normal position.

3. In a machine of the character described, capable of multiple-item transactions comprising several item-entering operations for entering different kinds of items and a final item-total operation, the combination of a plurality of operable control elements corresponding to different kinds of items; a differential mechanism associated with the control elements; an increment or step-by-step counter for each control element; means including a pitman to actuate each counter; means to operate the pitmans in one direction to add "one" in the corresponding counters; means normally effective to move the pitmans out of coacting relationship with the operating means; means controlled by the differential mechanism to retain the pitman corresponding to the operated control element in coacting relationship with the operating means to add "one" in the counter corresponding to said operated control element; and means effective in an item-total operation to restore the operated pitmans in the opposite direction so that each pitman and its corresponding counter may be in condition to be operated once during the item-entering operations of a multiple-item transaction.

4. In a machine of the class described, constructed and arranged to perform transactions comprising several operations of one kind and a final operation of another kind, the combination of a plurality of increment or step-by-step counters, for counting the operations of said one kind; means including a movable pitman to actuate each counter; means to move the pitmans from a normal position to an operated position to cause "one" to be entered in the corresponding counters, said pitmans normally in coacting relationship with said moving means; means effective in each machine operation to move the pitmans out of coacting relationship with the first moving means; means effective in said one kind of operation to selectively hold any pitman against movement by the second moving means, to render said any pitman operative by the first moving means; means to yieldingly retain the operated pitman in operated position until said final operation; and means effective in said final operation to restore all operated pitmans to normal position to insure that no pitman may be operated more than once during each complete transaction.

5. In a machine of the character described, constructed and arranged to perform several operations of one kind and a final operation of another kind, the combination of a plurality of increment counters for counting the operations of one kind; means including a pitman to actuate each counter; means to operate the pitmans in one direction to cause "one" to be entered in the corresponding counters, said pitmans normally in coacting relationship with said operating means; means effective each machine operation to move the pitmans out of coacting relationship with the operating means; means effective in said one kind of operation to selectively retain each pitman against movement by the moving means to render said pitmans operative; a rockable bail coacting with the pitmans and constructed and arranged to be actuated in said one direction by any operated pitman; means to yieldingly retain the bail and the operated pitman in operated position; and means effective in said final operation and coacting with the bail to cause said bail to restore the operated pitman opposite to said one direction to normal position.

6. In a machine of the character described, constructed and arranged to perform several operations of one kind and a final operation of another kind, the combination of a plurality of increment counters for counting the operations of said one kind; means including a pitman to actuate each counter; means to operate the pitmans in one direction to cause "one" to be entered in the corresponding counters, said pitmans normally in coacting relationship with said operating means; means effective each machine operation to move the pitmans out of coacting relationship with the operating means; means effective in said one kind of operations to selectively retain each pitman against movement by the moving means to render said pitmans operative; an increment counter for counting "one" each final operation; means including a rockable bail to operate the last-named counter, said bail rockable first in a retrograde or take-up direction by any operated pitman, said bail and said operated pitman constructed and arranged to remain in operated position; and means effective in said final operation to operate the bail in a feeding or return direction to enter "one" in the last-named counter, and to restore the operated pitman to normal position.

7. In a machine of the class described, capable of performing single-item operations, the combination of a plurality of operation control elements corresponding to various kinds of items, any one of which items may be entered in a single-item operation; an increment counter corresponding to each control element and arranged to count one when the corresponding control element is effective; a pitman operatively connected to each counter; means to operate the pitmans in one direction to actuate the corresponding counters, said pitmans normally in coacting relationship with said operating means; means effective each machine operation to move the pitmans out of coacting relationship with the operating means; means selectively controlled by the effective control element to retain the corresponding pitman in cooperating relationship with the operating means to render said pitman operative; an increment counter to count one each single-item operation; means including a rockable bail to operate the last-named counter, said bail rockable first in a retrograde or take-up direction by any operated pitman; and means effective in the latter part of a single-item operation to rock the bail in a feeding or return direction to actuate the last-named counter and to restore the operated pitman to normal position.

8. In a machine of the class described, capable of performing single-item operations, the combination of a plurality of operation control elements corresponding to various kinds of items, any one of which items may be entered in a single-item operation; an increment or step-by-step counter corresponding to each control element and arranged to count one when the corresponding control element is effective; a pitman operatively connected to each counter; means to operate the pitmans in one direction to actuate the corresponding counters, said pitmans normally in coacting relationship with said operating means; means effective each machine operation to move the pitmans out of coacting relationship with the operating means; means selectively controlled by the effective control element to retain the corresponding pitman in cooperating relationship with the operating means to render said pitman operative to count the kind of item being entered; an increment counter to count one each single-item operation; means including a rockable bail to operate the last-named counter, said bail rockable first in a retrograde or takeup direction by any operated pitman; a single-item control element; and means including a member rendered operative by the single-item control element to rock the bail in feeding or return direction to actuate the last-named counter and to restore the operated pitman to normal position.

9. In a machine of the class described, constructed and arranged to perform multiple-item transactions comprising several item entering operations, and a final item-total operation, the combination of a plurality of item-control elements operable to initiate item-entering operations; an increment counter corresponding to each item-control element; means including a pitman operatively connected to each counter; means to operate the pitmans in feeding direction to advance the corresponding item counters one digit, said pitmans normally in coacting relationship with said operating means; means to yieldingly lead the pitmans out of coacting relationship with the operating means; selective means controlled by the item control elements to selectively retain the pitman corresponding to the operated control element in coacting relationship with the operating means to count one in the corresponding counter, said pitman arranged to remain in operated condition until the final item-total operation is performed; an item-total increment counter; means including a bail or rod to operate the item-total counter, said bail operable in a take-up direction by any one of the pitmans while moving in feeding direction; an item-total control element to initiate item-total operation; and means rendered effective by the item-total control element to restore the bail in a feeding or return direction to advance the item-total counter one digit to count the item-total operations, said bail also effective upon being returned to restore the operated pitmans in a return or take-up direction.

10. In a machine of the character described, capable of various types of operations, the combination of a plurality of operation control elements; an increment counter for each control element; means including a pitman operatively connected to each counter; means to operate the pitmans in one direction to actuate the corresponding counters, said pitmans normally in coacting relationship with said operating means; means effective each machine operation to move the pitmans out of coacting relationship with the operating means; a differential mechanism for the control elements; means operated by the differential mechanism to retain the pitman corresponding to the effective control element in coacting relationship with the operating means to cause said pitman and the corresponding counter to be actuated to count certain types of operations; a special counter for counting another type of operation; means including a movable member normally effective to render the special counter operative; and means operated by the effective pitman while being actuated for moving said movable member to ineffective position to prevent operation of the special counter after any one of the counters for the operation control elements has been actuated.

11. In a machine of the character described, constructed and arranged to perform multiple-item transactions comprising several item-entering operations and an item-total operation, the combination of a plurality of item-entering control elements; an increment counter for each control element; means including a pitman operatively connected to each item counter; means to operate the pitmans in one direction to actuate the corresponding counters, said pitmans normally in coacting relationship with said operating means; means effective each machine operation to move the pitmans out of coacting relationship with the operating means; a differential mechanism for the control elements; means operated by the differential mechanism to retain the pitman corresponding to the effective control element in coacting relationship with the operating means to cause the corresponding counter to be actuated; an increment counter for counting item-total operations; means including a rockable bail for operating the item-total counter, said bail rockable in take-up direction by any one of the pitmans while operating in said one direction; an item-total control element; means including a normally ineffective member to rock the bail in feeding direction; means controlled by the item-total control element to render the member effective to rock the bail to cause the item-total counter to be actuated; a special increment counter; means including a special pitman normally effective to operate the special counter; means effective each machine operation to yieldingly move the special pitman to ineffective position; means normally effective to retain the special pitman against movement by the yieldingly movable means to render the special counter operative; and means operated by the bail during its movement in take-up direction to move the retaining means to ineffective position to prevent operation of the special counter in multiple-item transactions.

References Cited in the file of this patent

UNITED STATES PATENTS

| | | |
|---|---|---|
| 1,394,256 | Fuller | Oct. 18, 1921 |
| 2,178,362 | Robertson | Oct. 31, 1939 |
| 2,386,364 | Spurlino et al. | Oct. 9, 1945 |
| 2,390,870 | Colley | Dec. 11, 1945 |
| 2,496,106 | Shoup | Jan. 31, 1950 |
| 2,625,322 | Moser | Jan. 13, 1953 |

UNITED STATES PATENT OFFICE
CERTIFICATION OF CORRECTION

Patent No. 2,962,209                         November 29, 1960

Frank R. Werner et al.

It is hereby certified that error appears in the above numbered patent requiring correction and that the said Letters Patent should read as corrected below.

Column 1, line 60, for "totaizers" read -- totalizers --; column 2, line 34, after "totalizer" insert -- line --; line 42, for "movement of" read -- movement to --; column 4, line 9, after "of" insert -- certain --; line 42, for "there" read -- these --; column 5, line 17, for "counter" read -- count --; column 8, line 52, for "shift" read -- shaft --; column 15, line 34, for "primarily" read -- primary --; column 22, line 15, for "step-to-step" read -- step-by-step --; column 28, line 7, for "movement of" read -- movement to --; column 35, line 16, fo "conrol" read -- control --.

Signed and sealed this 2nd day of May 1961.

(SEAL)
Attest:

ERNEST W. SWIDER
Attesting Officer

DAVID L. LADD
Commissioner of Patents